US006766956B1

(12) United States Patent
Boylan, III et al.

(10) Patent No.: US 6,766,956 B1
(45) Date of Patent: Jul. 27, 2004

(54) SYSTEM AND METHOD FOR USING PORTABLE DEVICE WITH BAR-CODE SCANNER

(75) Inventors: Peter C. Boylan, III, Tulsa, OK (US); Toby DeWeese, Tulsa, OK (US); Jeff Tomlins, Tulsa, OK (US); Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 33 days.

(21) Appl. No.: 09/878,050

(22) Filed: Jun. 8, 2001

Related U.S. Application Data

(60) Provisional application No. 60/210,420, filed on Jun. 8, 2000.

(51) Int. Cl.[7] .................................................. G06K 7/10
(52) U.S. Cl. ......................... 235/462.45; 235/462.46; 235/462.47; 235/472.01; 235/472.03; 235/383; 707/3
(58) Field of Search ..................... 235/462.45, 462.46, 235/462.49, 472.01, 383, 472.03; 707/3

(56) References Cited

U.S. PATENT DOCUMENTS

| | | | | |
|---|---|---|---|---|
| 4,329,684 A | | 5/1982 | Monteath et al. ............ | 345/180 |
| 4,488,179 A | | 12/1984 | Kruger ........................ | 348/706 |
| 4,866,258 A | * | 9/1989 | Ueda et al. .............. | 235/462.49 |
| 4,977,455 A | | 12/1990 | Young ......................... | 348/460 |
| 5,253,066 A | | 10/1993 | Vogel .......................... | 725/28 |
| 5,468,948 A | * | 11/1995 | Koenck et al. ......... | 235/472.01 |
| 5,589,892 A | | 12/1996 | Knee et al. ................. | 348/731 |

(List continued on next page.)

FOREIGN PATENT DOCUMENTS

| | | | | |
|---|---|---|---|---|
| WO | WO 99/12346 | 3/1999 | .......... | H04N/5/782 |
| WO | WO 99/66725 | 12/1999 | .......... | H04N/5/782 |
| WO | WO 00/04706 | 1/2000 | ............ | H04N/5/00 |
| WO | WO 00/04709 | 1/2000 | .......... | H04N/5/445 |
| WO | WO 00/16548 | 3/2000 | .......... | H04N/5/445 |
| WO | WO 00/27122 | 5/2000 | .......... | H04N/7/173 |
| WO | WO 00/28734 | 5/2000 | .......... | H04N/5/445 |
| WO | WO 00/78050 | 12/2000 | .......... | H04N/7/173 |

OTHER PUBLICATIONS

:Cue Readers, Digital:Convergence Corporation, at http://www.crq.com/master_templ.cfm?view=products&products=cuereader (printed Sep. 24, 2001).

GoCode, The Code Corporation, at http://www.gocode.com/products/reader.htm (printed Sep. 24, 2001).

Paperclick, NeoMedia Technologies, Inc., at http://www.paperclick.com/How_works.htm (printed Sep. 24, 2001).

VIDEO Plus+, Gemstar Development Limited, at http://www.gemstar.co.uk/en/videoplus/intro–main.html (printed Sep. 24, 2001).

Primary Examiner—Michael G. Lee
Assistant Examiner—Steven S. Paik
(74) Attorney, Agent, or Firm—Fish & Neave; Jared Kneitel

(57) ABSTRACT

A portable device having code scanning features is provided. Information associated with scanned codes may be communicated to the portable device. This information may be communicated from a remote site, a docking station or another portable device. Information associated with scanned codes may be stored at a storage device at the portable device. Information associated with codes may be presented to the user via an output device at the portable device. In another suitable embodiment, information associated with scanned codes may be acquired by a docking station. Information acquired by the docking station may be presented to the user via an output device at the docking station. The docking station and portable device may have suitable communications circuitry such that portable device may interface with the docking station.

60 Claims, 23 Drawing Sheets

U.S. PATENT DOCUMENTS

| | | | |
|---|---|---|---|
| 5,594,509 A | | 1/1997 | Florin et al. ................. 348/731 |
| 5,640,002 A | * | 6/1997 | Ruppert et al. ......... 235/462.46 |
| 5,880,768 A | | 3/1999 | Lemmons et al. .............. 348/1 |
| 5,939,695 A | * | 8/1999 | Nelson ....................... 235/383 |
| 6,061,097 A | | 5/2000 | Satterfield ................... 348/569 |
| 6,097,441 A | * | 8/2000 | Allport ........................ 348/552 |
| 6,137,950 A | | 10/2000 | Yuen ............................ 386/83 |
| 6,202,062 B1 | * | 3/2001 | Cameron et al. ............... 707/3 |
| 6,321,991 B1 | * | 11/2001 | Knowles ................ 235/472.01 |
| 6,405,926 B1 | * | 6/2002 | Yomogida et al. ...... 235/462.46 |

* cited by examiner

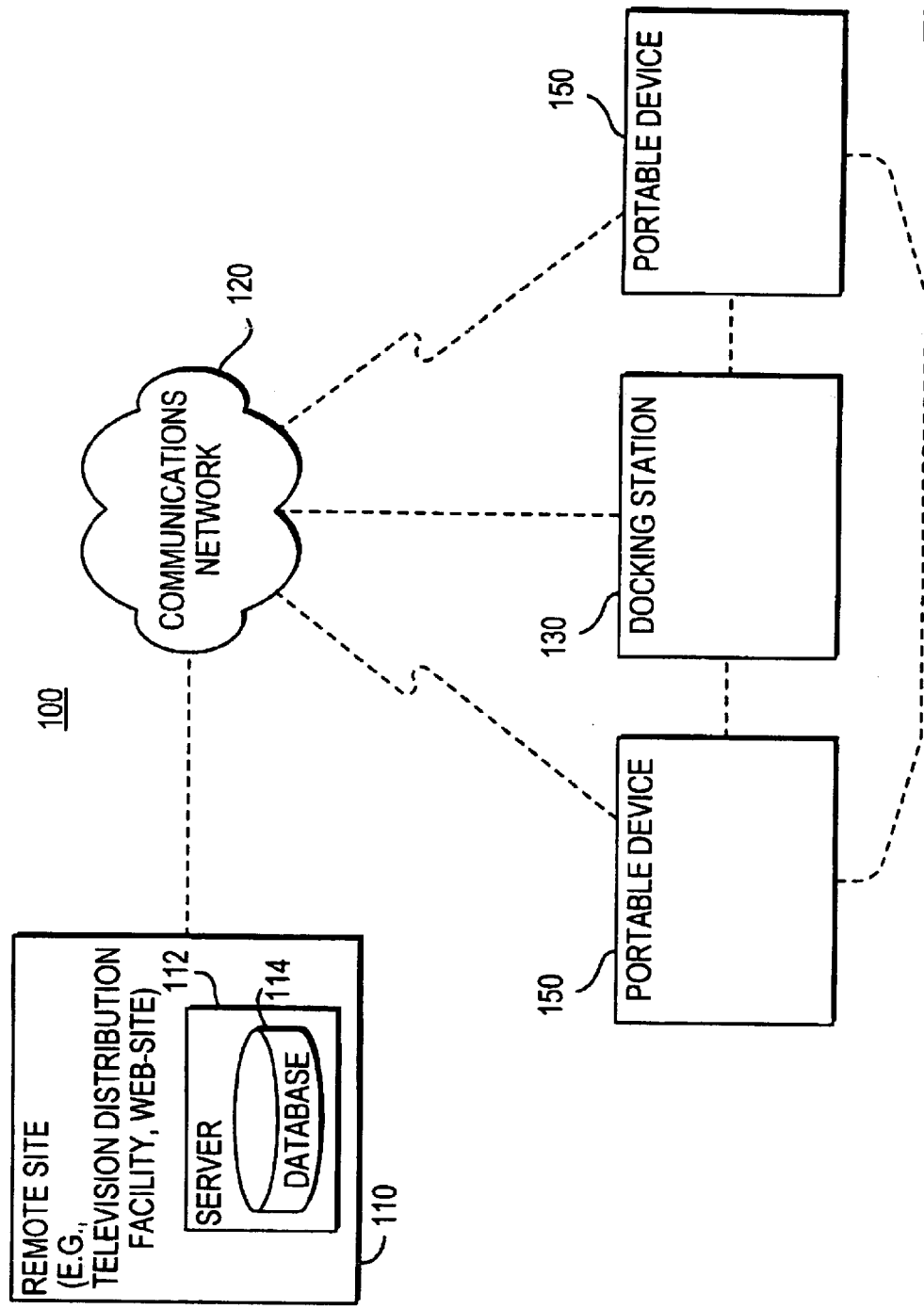

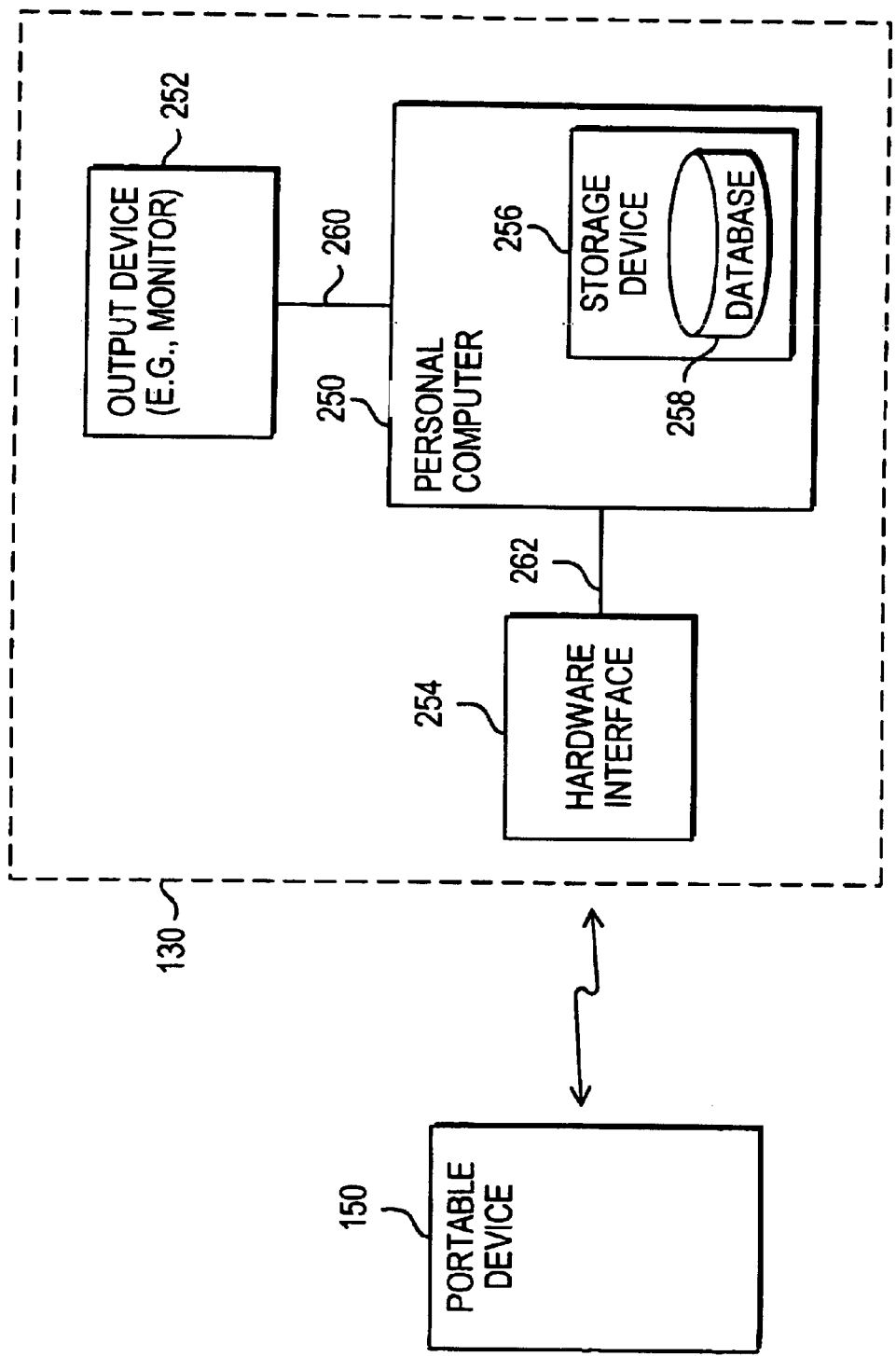

SYSTEM AND METHOD FOR USING PORTABLE DEVICE WITH BAR-CODE SCANNER

This application claims the benefit of U.S. provisional application No. 60/210,420 filed on Jun. 8, 2000, which is hereby incorporated by reference herein in its entirety.

BACKGROUND OF THE INVENTION

This invention relates to information and media delivery systems and, more particularly, to information and media delivery systems that include a portable user device having code scanning features.

With the advent of modern electronic distribution systems, society has access to an unprecedented amount of information and media. In many delivery systems, the amount of available information and media can often overwhelm users of such systems. Guidance systems, such as television program guides, guides for audio services, and guides for personal video recorders (PVRs), have been developed to aid users in navigating available information and media (e.g., television programs, pay-per-view programs, near-video-on-demand (NVOD) programs, video-on-demand (VOD) programs, music, promotional materials, and other types of media) and finding desirable content. Improving the user interfaces of guidance systems and other information and media delivery systems may increase the ease with which users can navigate through media and information.

It is therefore an object of the present invention to facilitate the retrieval of information associated with products, goods, or services.

SUMMARY OF THE INVENTION

This and other objects are accomplished in accordance with the principles of the present invention by providing systems and methods for using a portable device with a code scanner.

The portable device with a code scanner may be used to acquire information associated with codes in response to codes being scanned. The information may be acquired from any suitable source. The information may be displayed on an output device at the portable device or at a docking station. An action associated with the scanned code may then be performed.

The portable device with a code scanner may be used to scan codes printed or displayed on any medium such as printed publications, maps, walls, doorways, signs, street signs, addresses, public announcements, menus in restaurant (e.g., in windows or at the table), invoices, printouts of web-pages, products, brochures, tickets, microfiche, television screens, movie theater screens, or any other suitable medium. The codes may or may not be in public view. Such codes may be one or two dimensional. Such codes may include bar-codes such as Universal Product Codes (UPC), EAN Article Numbering (EAN) codes, Japanese Article Numbering (JAN) codes, International Article Numbering (IAN) codes, International Standard Book Number (ISBN) codes, scannable digital water marks, or any other suitable code. For example, code scanning equipment may also be able to read text. The portable device may be any suitable portable device, such as a remote control, cell phone, e-book, personal digital assistant (PDA), equipped with code scanning circuitry and software. Any suitable code scanning circuitry and software may be used.

The portable device may scan codes and obtain information or media associated with scanned codes using any suitable approach. For example, information associated with scanned codes may be stored in a storage device at the portable device. The portable device, may communicate scanned codes to any suitable site. Information and media associated with the scanned codes, may be communicated to the portable device from any suitable site. Such sites may include any suitable remote site (e.g., a web-site, a television distribution facility, a data service provider), a docking station, another portable device, or any other suitable site.

The portable device may have communications circuitry suitable for obtaining such information and media. Communications circuitry may be used to obtain information or media, or access a web-page, and may be able to obtain such information and media via a wireless or wired connection. Information communicated to the portable device may be presented to the user via an output device at the portable device.

If desired, the portable device may communicate with a docking station. A docking station may be any suitable device such as, for example, a personal computer (PC), a television set-top box and/or television, or any other suitable device. The docking station may maintain a database of information associated with codes.

The portable device and docking station may communicate via any suitable connection. Such connections may include infrared, radio-frequency, serial, parallel, etc. Any suitable communications protocol or standard such as IEEE standard 802.11(b), FireWire, or Bluetooth may be used.

The docking station may communicate information or media to the portable device for presentation to the user, or may present the information to the user itself. The docking station may include an output device to present information to the user. If the docking station includes an output device, it may be unnecessary to include an output device at the portable device.

The docking station may obtain information to be presented or communicated to the portable device. The portable device may also obtain information to be presented. The docking station or portable device may obtain information or media from a server or a web-page over a local area network (LAN), wide area network (WAN), or the Internet.

Information that the portable scanning device system may present to the user may include, for example, information associated with television program listings. Codes associated with television program listings may be printed in a television program guide. In response to such a code being scanned, program information for a program may be displayed. Reminders for events, such as the broadcast of a television program, may be set by the user of the portable scanning device system, or automatically in response to a code being scanned. The recording of a television program or television series may also be scheduled.

Other information may include information associated with goods, services or products. In response to a code associated with an item that may be purchased or traded, information associated with the item may be presented. The user may then order the item.

In another aspect of the invention, enhanced information associated with codes may be presented in response to a code being scanned. Such information may be, for example, promotional media, such as text, graphics, audio, video, animations, or any other suitable media associated with the printed promotional material.

The portable scanning device system may also be used to schedule the use of equipment (e.g., computers, overhead projectors, etc.) or facilities (e.g., conference rooms, lecture halls, workrooms, etc.). Codes associated with facilities and equipment may be scanned. Such codes may be placed, for example, on the doorways of facilities, on maps, or on equipment. The portable device may then obtain the upcoming schedule of use for the facility or equipment. The user of the portable scanning device system may then schedule the use of the equipment or facility.

The portable device may also be used to scan codes associated with movie listings or promotions, concert promotions, exhibit promotions, or promotions or listings associated with other scheduled events. Schedules, seating availabilities, ticket prices, or other suitable information for these events may then be presented to the user. The portable scanning device system may allow the user to order tickets for the events.

In a further aspect of the invention, printouts of webpages may be automatically labeled with codes by, for example, a web-browser running on a portable device or a docking station. The code may indicate the Universal Resource Locator (URL) of the printed page. In response to the user scanning the code, the portable device may automatically launch a web-browser and access the page via the URL, thereby relieving the user of having to launch the browser and manually enter the URL. If desired, any link within a web-page may be coded to allow the user to scan a code associated with the link and automatically go to the linked resource.

In a further aspect of the invention, users may scan codes associated with articles in newspapers or other periodicals. The portable device may then access a web document associated with the article and provide the user with information that supplements the content of the article. In another suitable approach, the portable device may obtain supplemental information and present the information to the user. In this way, publishers may direct the users to web-sites or other electronic documents associated with the original printed publication. The web-sites and other electronic documents may be used to provide additional advertising and purchase opportunities, if desired.

In a further aspect of the invention, the portable scanning device system may present translated information. People who do not understand the language in which the matter is printed may scan a code associated with the matter. The portable scanning device system may use the scanned information to download the printed matter in the language of the user. This may be performed based on, for example, a user profile set up in the device. In another suitable approach, the portable device may access a web-site or a web-page that has the printed matter in the user's language. This may relieve the user of having to translate such printed matter using electronic or non-electronic means. These web-sites or information may be maintained by governmental or private entities interested in providing printed matter in multiple languages.

In a further aspect of the invention, users may scan codes associated with products while shopping in a mall or other store. The user may also scan codes while at home. The portable device may store the codes or upload them to a station. The portable device or the station may allow the users to purchase the products remotely. If desired, the portable device or the station may periodically query the merchants' web-sites to determine if the products associated with the scanned codes are on sale (i.e., sold at a price lower than their normal price), or if merchants are having sales in general. The portable device or station may notify the user of the sale. The user may then order the product at the sale price using the portable device or station. This sale-finding feature may also be performed for products or catalog items scanned within the home. In still another suitable approach, the portable device or the docking station may search the Internet for the best price available for products associated with scanned codes.

BRIEF DESCRIPTION OF THE DRAWINGS

Further features of the invention, its nature and various advantages will be more apparent from the accompanying drawings and the following detailed description of the preferred embodiments.

FIG. 1 is a block diagram of an illustrative portable scanning device system in accordance with the principles of one embodiment of the present invention.

FIGS. 2A and 2B are block diagrams of illustrative docking stations in accordance with the principles of one embodiment of the present invention.

DETAILED DESCRIPTION OF THE PREFERRED EMBODIMENTS

Figure 2A:
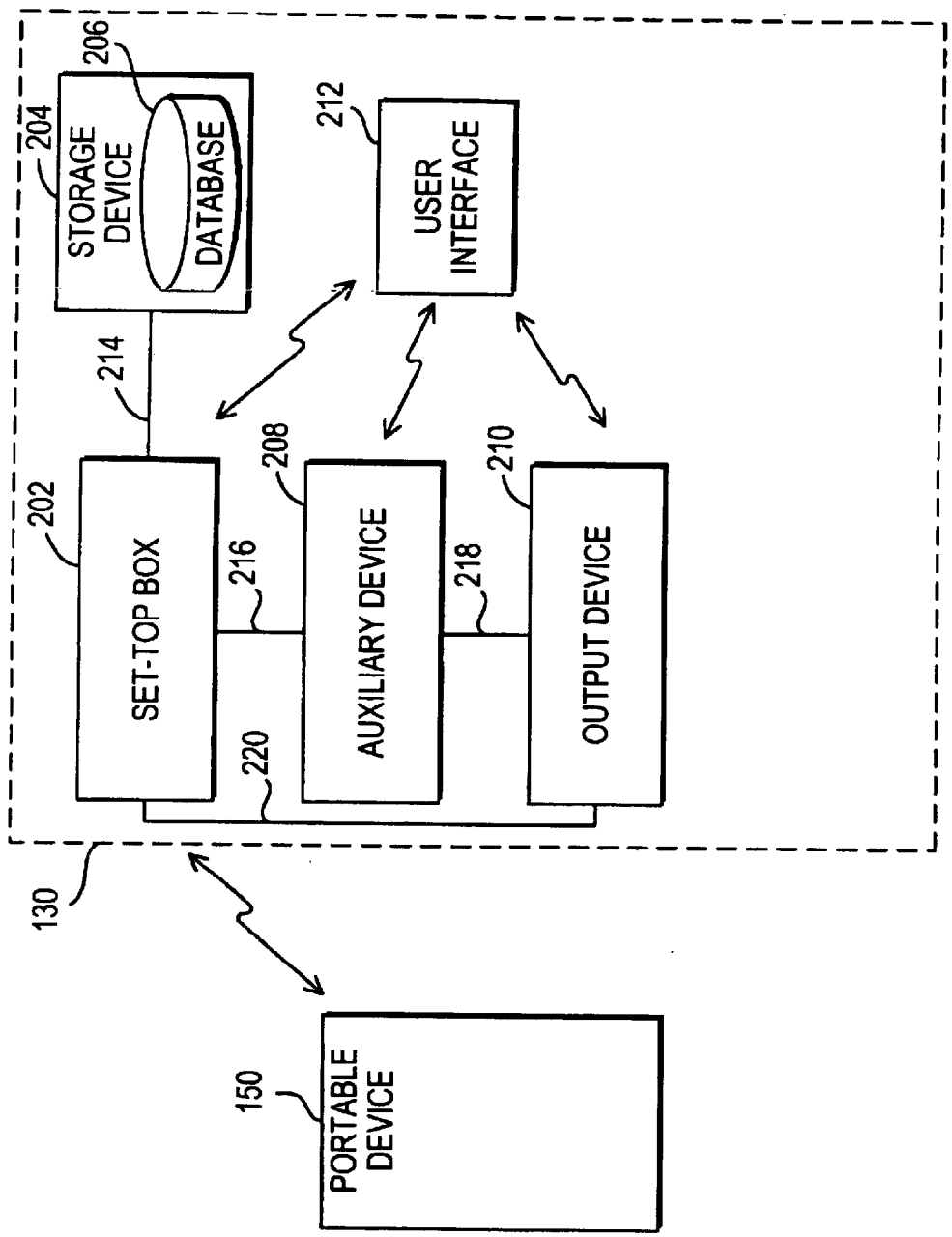

An illustrative portable scanning device system 100 in accordance with the present invention is shown in FIG. 1. Illustrative portable scanning device system 100 may include a remote site 110, a communications network 120, a docking station 130, and portable devices 150. Although portable scanning device system 100 is shown with one docking station 130 and two portable devices 150, it is to be understood that portable scanning device system 100 may include one or more docking stations 130 and one or more portable devices 150.

Remote site 110 may be a data service provider, a television distribution facility (e.g., a cable system headend, a broadcast distribution facility, a satellite television distribution facility), a web hosting facility, or any other suitable facility. Remote site 110 may include a server 112. Server 112 may include or communicate with a database 114 for storing any suitable information. Server 112 may be based on one or more computers. Server 112 and database 114 may be capable of handling text, images, graphics, video, web-pages, any other suitable element, or a combination of these elements. In addition, server 112 and database 114 may be capable of providing interactive television services such as an interactive program guide, personal video recorder functions and video on demand (VOD). With such applications, videos or other video information that is stored on server 112 may be requested by users at docking station 130, portable devices 150, or any other suitable equipment. The videos and other video information may then be communicated to docking station 130, portable devices 150, or any other suitable equipment via communications network 120 for immediate play back and/or storage on a storage device (e.g., a storage device at docking station 130, a storage device at portable device 150).

As shown in FIG. 1, information may be communicated between portable devices 150, remote site 110, and docking stations 130 via communications network 120. Information may also be communicated to and from any other suitable source not shown via communications network 120. Communications network 120 may be any suitable data distribution network, and may include a satellite link, a telephone link, the Internet, a cable television system, a fiber optic link, a microwave link, a local area network, a wide area network, any other suitable communications link, or a combination of the same.

Information may also be communicated directly between portable devices 150 and docking station 130, and between portable devices 150. Portable devices 150 may be in communication with each other and with docking station 130 using any suitable approach. For example, portable device 150 may be connected to docking station 130 using an infrared connection. Other suitable connections may include radio-frequency, serial, or parallel connections. Any suitable communications protocol or standard such as IEEE standard 802.11(b), FireWire, or Bluetooth may be used. Information may be communicated between remote site 110, docking station 130, and portable user devices 150, and communications network 120 via a wireless or wired connection. Information may also be communicated between portable user devices 150, and between portable user devices 150 and docking station 130, via a wireless or wired connection.

FIGS. 2A and 2B show two illustrative docking stations. As shown, docking stations 130 may communicate with portable user device 150. Both embodiments of docking station 130 may include suitable processing circuitry to control the operation of docking stations 130. As shown in the embodiment of FIG. 2A, portable scanning device system 100 may be run on a set-top box arrangement. As shown in the embodiment of FIG. 2B, portable scanning device system 100 may be run on a personal computer arrangement.

In the embodiment shown in FIG. 2A, processing circuitry may be included in a set-top box 202. Set-top box 202 may be a receiver or any other suitable television or computer equipment into which circuitry similar to set-top box circuitry has been integrated (e.g., an integrated set-top box, a WebTV box, a personal computer television (PC/TV)).

Set-top box 202 may include suitable communications circuitry to communicate with portable device 150, server 112, or any other suitable device. Communications circuitry may also be external to set-top box 202. Docking station 130 may communicate with portable device 150 and/or server 112 via any suitable connection. Such connections may include infrared, radio-frequency, serial, parallel, etc. Any suitable communications protocol or standard such as IEEE standard 802.11(b), FireWire, or Bluetooth may be used. Communications circuitry may include a wireless interface (e.g., a two-way infrared port), or a wired connection. Portable device 150 may interface with a hardware interface (not shown) at docking station 130.

Information from set-top box 202 may be exchanged with a storage device 204 such as a server, a web server, a remote server, a home server, a personal video recorder (e.g., TiVo™ or ReplayTV™), a writeable DVD, a writeable CD, or any other type of recording device so that codes and information associated with codes may be stored. Storage device 204 may include a database such as database 206. Database 206 may be any suitable database. Information may be exchanged between set-top box 202 and storage device 204 via communications link 214. Communications link 214 may be any suitable link.

As shown in FIG. 2A, docking station 130 may include an auxiliary device 208. Auxiliary device 208 may include VCRs, personal video recorders (e.g., TiVo™, ReplayTV™), Digital Video Disc players, or any other suitable auxiliary device. Information may be communicated between set-top box 202 and auxiliary device 208 via communications link 216. Communications link 216 may be any suitable communications link. In the arrangement shown in FIG. 2A, auxiliary devices may be used conventionally when portable scanning device system 100 is in use.

Information from auxiliary device 208 and set-top box 202 may be communicated to an output device 210. Output device 210 may be a computer monitor, a television monitor, or any other suitable video output device. Output device 210 may also have suitable audio output equipment such that audio information transferred to output device 210 may be audible. Information from set-top box 202 and auxiliary device 208 may be communicated to output device 210 via communications links 220 and 218 respectively. Communications links 220 and 218 may be any suitable communications links.

Set-top box 202, auxiliary device 208, and output device 210 may be controlled by user interface 212. User interface 212 may be a remote control, a mouse, a trackball, a wireless keyboard, a voice recognition system, a touch-pad, dedicated keys, or any other suitable user interface.

In the embodiment shown in FIG. 2B, docking station 130 may include a personal computer 250, an output device 252, a hardware interface 254, and any other suitable component. Personal computer may include a storage device for storing codes and information associated with codes. Storage device 256 may include a database 258 for storing codes and information associated with codes.

Personal computer 250 may include suitable communications circuitry to communicate with portable device 150, server 112, or any other suitable device. Docking station 130 may communicate with portable device 150 and/or server 112 via any suitable connection. Such connections may include infrared, radio-frequency, serial, parallel, etc. Any suitable communications protocol or standard such as IEEE standard 802.11(b), FireWire, or Bluetooth may be used. Communications circuitry may include a wireless interface, or a wired connection.

As shown in FIG. 2B, portable device 150 may interface with a hardware interface 254. Hardware interface 254 may be, for example, a two-way infrared-port. Information may be communicated between portable device 150 and hardware interface 254 via compatible two-way infrared ports or any other suitable wireless connection. Information may also be communicated between portable device 150 and hardware interface 254 via any suitable wired connection. For example, hardware interface 254 may be a hardware slot into which portable device 150 can fit into. Information may be communicated between portable device 150 and hardware interface 254 via compatible contacts (e.g., pins).

Information may be communicated between hardware interface 254 and personal computer 250 via communications link 262. Communications link 262 may be any suitable communications link.

Information from personal computer 250 may be communicated to an output device 252. Output device 252 may be a computer monitor, a television monitor, or any other suitable video output device. Output device 252 may also have suitable audio output equipment such that audio information transferred to output device 252 may be audible. Information from personal computer 250 may be communicated to output device 252 via communications link 260. Communications link 260 may be any suitable communications links.

Figure 3:
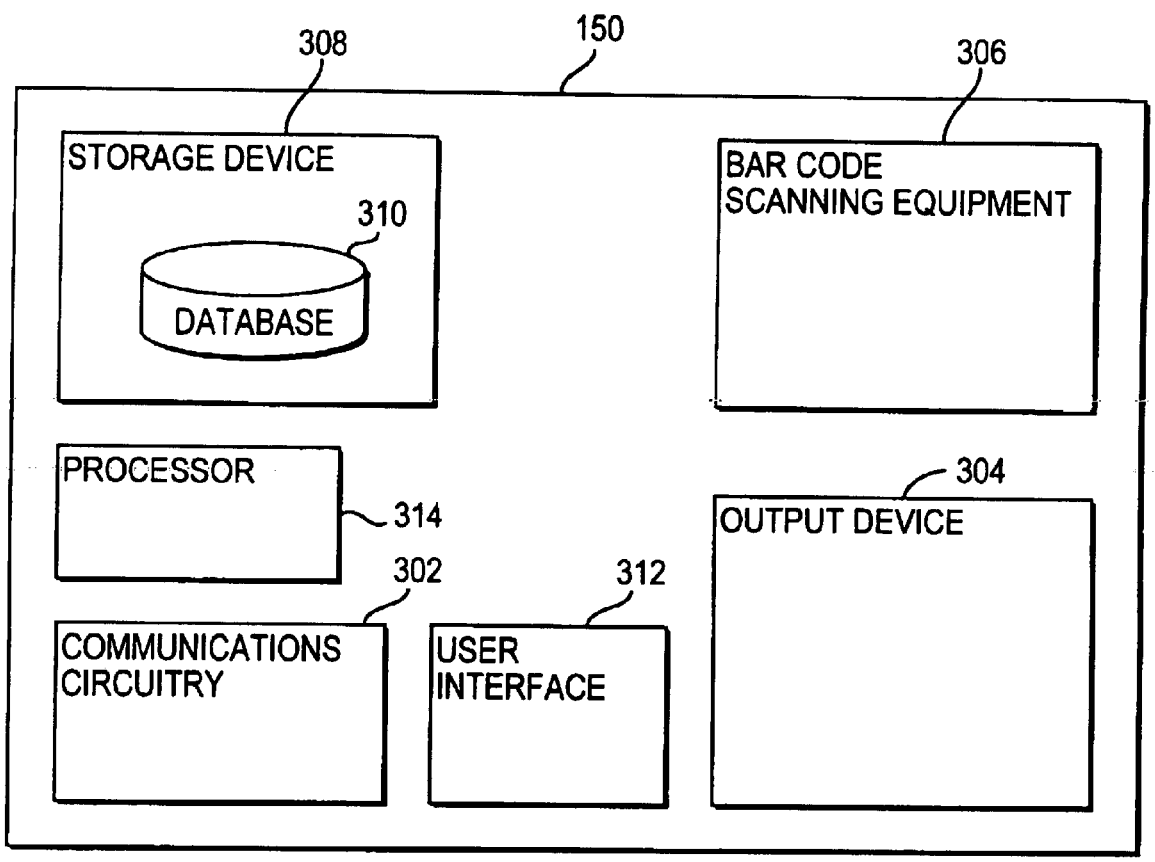
FIG. 3 is a block diagram of an illustrative portable device in accordance with the principles of one embodiment of the present invention.

As shown in FIG. 3, portable device 150 may include suitable communications circuitry 302, output, device 304, code scanning equipment 306, storage device 308, user interface 312, processor 314, and any other suitable device or equipment. Storage device 308 may include a database such as database 310. Processor 314 may control the operations of portable device 150. Portable device 150 may be any suitable a portable device, such as a remote control, cell phone, e-book, personal digital assistant (PDA), equipped with code scanning circuitry and software. Any suitable code scanning circuitry and software may be used. Portable device 150 may function as a remote control, cell phone, e-book, personal digital assistant (PDA), or any other suitable device, or perform functions not directly related to scanning.

Communications circuitry 302 may be used to communicate with docking station 130, other portable devices 150, and/or server 112. Communications circuitry 302 may enable portable devices 150 to communicate with server 112 and/or docking station 130. Communications circuitry 302 may include, for example, a modem (e.g., any suitable analog or digital telephone dial-up modem, or a cable modem), a network interface card (e.g., an Ethernet card), an infrared interface, a radio-frequency interface, a hardware interface, a serial interface, a parallel interface, etc. Any suitable communication protocol or standard such as IEEE standard 802.11(b), Bluetooth, or FireWire may be used.

Communications circuitry 302 may communicate via communications network 120. For example, communications circuitry 302 may acquire information from server 112. As shown in FIG. 1, information from server 112 may be communicated to portable device 150 via communications network 120. In those embodiments in which information may be communicated directly from server 112 to portable device 150, docking station 130 may be unnecessary.

Storage device 308 may be a server, a writeable DVD, a writeable CD, dynamic RAM, static RAM, flash memory, any other type of computer memory, or any other type of recording device. Storage device 308 may include a database such as database 310. Any suitable information may be stored on database 310. Storage device 308 and database 310 may be capable of handling text, images, graphics, video, any other suitable element, or a combination of these elements. Storage device 308 and database 310 may be capable of providing interactive services such as an interactive guide.

Code scanning equipment 306 may include any suitable code scanning hardware, circuitry, and software. Code scanning equipment 306 may include scanning equipment that employs single or multiple laser scanning devices. Code scanning equipment 306 may include scanning equipment that employs an "aim-and-shoot" method of scanning codes. Any other suitable method of scanning codes or combination of methods may be used. For example, devices that use a "scanning pen" method of scanning codes may also be used.

Code scanning equipment 306 may be used to scan codes printed or displayed on any medium such as printed publications, maps, walls, doorways, signs, street signs, addresses, public announcements, menus in restaurant (e.g., in windows or at the table), invoices, printouts of web-pages, products, brochures, tickets, microfiche, television screens, movie theater screens, or any other suitable medium. The codes may or may not be in public view. Such codes may be one or two dimensional. Such codes may include bar-codes such as Universal Product Codes (UPC), EAN Article Numbering (EAN) codes, Japanese Article Numbering (JAN) codes, International Article Numbering (IAN) codes, International Standard Book Number (ISBN) codes, digital scannable watermarks, or any other suitable code. For example, code scanning equipment 306 may also be able to read text. In those embodiments in which text is to be read by code scanning equipment 306, code scanning equipment 306 may have Optical Character Reading (OCR) functionality.

If code scanning equipment malfunctions and cannot scan codes properly, is otherwise having difficulty scanning codes, or the user opts to manually enter information contained in a code, the user may enter code information (e.g., Universal Product Code (UPC)). The user may enter such information or any other pertinent information via user interface 312. For example, the user may type in a UPC using a keyboard.

Codes scanned by code scanning equipment 306, or otherwise communicated to portable device 150, may be stored on storage device 308 or database 310. Storage device 308 and database 310 may also store any other suitable information.

Portable scanning device system 100 may present information associated with a scanned code, or any other suitable information, on output device 304. Output device 304 may be any suitable portable video output device. Output device 304 may also include suitable audio output equipment such that audio information communicated to output device 304 may be audible.

Figure 4:
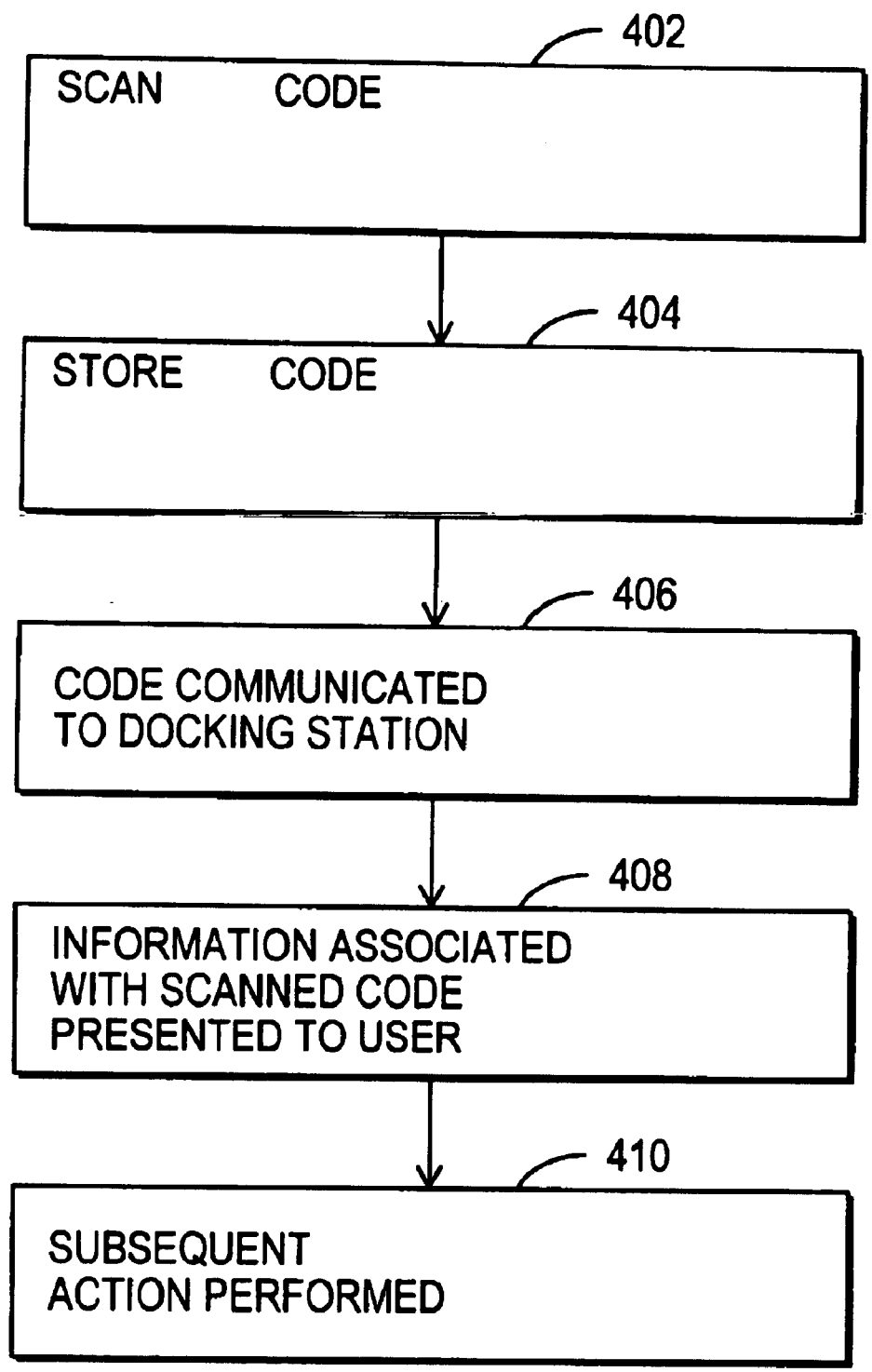
FIG. 4 is a flow chart of illustrative steps involved in scanning, storing the code, and communicating a code, presenting information associate with the code, and performing a subsequent action in accordance with the principles of one embodiment of the present invention.

As shown in the illustrative flow chart of FIG. 4, information associated with codes may be stored on any suitable equipment at any suitable location, presented to the user, and a subsequent action may be performed in response to codes being scanned. At step 402, the user of portable scanning device system 100 may scan a code. In response to a code being scanned, the code may be stored in any suitable location at step 404. At step 406, the code may be communicated to docking station 130. In response to the code being communicated to docking station 130, portable scanning device system 100 may present information associated with the scanned code to the user. This may occur at step 408. At step 410, portable scanning device system 100 may perform a subsequent action.

For example, if information associated with the scanned code were not present at docking station 130, information associated with the scanned code may be communicated to docking station 130 from server 112 via communications network 120. This information may be presented to the user of portable scanning device system 100 via output device 210 or 252 at docking station 130. This information may also be communicated to a portable device 150. The portable device 150 to which the information is communicated may be the same portable device 150 that was used to scan the code, or it may be a different portable device 150. Information received by portable devices 150 may be presented to the user of portable scanning device system 100 via output device 304. A suitable subsequent action may be, for example, purchasing a product associated with a scanned code. These examples are merely illustrative. Any suitable information may be presented, and any suitable action may be performed in response to a code being scanned. The order that events occur shown in FIG. 4 is also illustrative. For example, codes (and information associated with codes.) may be communicated to a docking station before the codes (and information associated with the codes) are stored.

Figure 5:
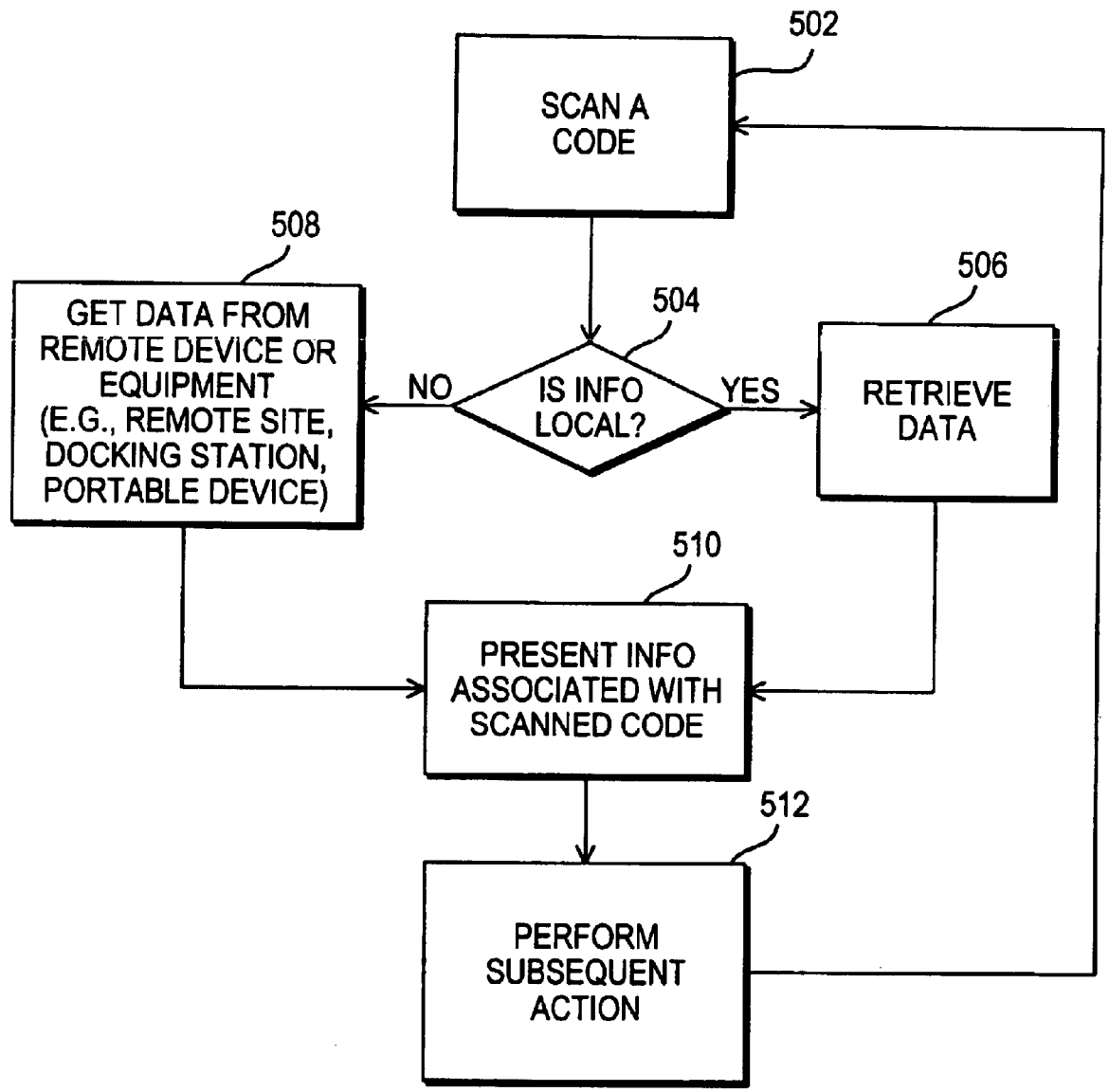
FIG. 5 is a flow chart of illustrative steps involved in scanning a code, retrieving information associated with the code, presenting information associated with the scanned code, and performing a subsequent action in accordance with the principles of one embodiment of the present invention.

As shown in the illustrative flow chart of FIG. 5, when portable scanning device system 100 is used to scan a code, information associated with that scanned code may be presented to the user. Actions may be performed subsequent to information being presented to the user.

At step 502, the user of portable scanning device system may scan a code. At step 504, portable scanning device system 100 may determine if information associated with the scanned code is local (i.e., stored at a storage device at portable device 150). If information associated with the scanned code is local, portable scanning device system 100 may retrieve the local information. This may occur at step 506. If, information associated with the scanned code is not local, portable scanning device system 100 may retrieve the information from a remote device or equipment (e.g., a remote site, a docking station, a portable user device). This may occur at step 508. When information associated with a scanned code is retrieved, that information may be presented to the user. This may occur at step 510. At step 512, portable scanning device system 100 may perform a subsequent action.

Figure 6:
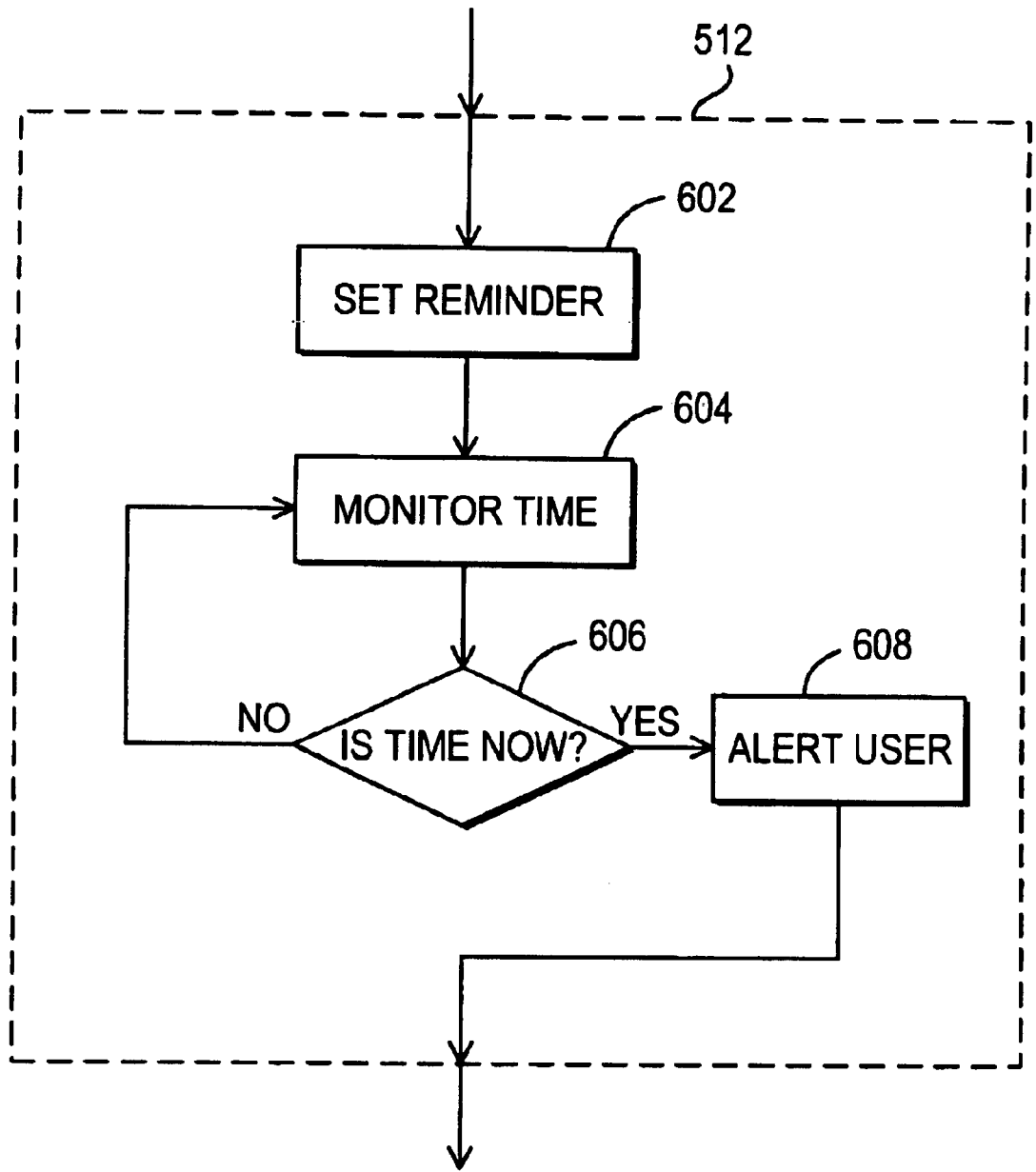
FIG. 6 is a flow chart of illustrative steps involved in setting a reminder in accordance with the principles of one embodiment of the present invention.

As shown in FIG. 6, for example, a subsequent action may be to set a reminder for an event. The event may be any type of event scheduled to occur at a future time. This could include, for example, a television program, a web event, a movie, a play or other theater event, a public exhibition, a sporting event, a sales event, a meeting, a conference, an appointment, or any other suitable event.

At step 602, portable scanning device 100 may set a reminder. The reminder may be set automatically in response to a code associated with an event being scanned. Portable scanning device system 100 may also prompt the user to set a reminder in response to a code associated with an event being scanned. At step 604, portable scanning device system 100 may then monitor the time. Any suitable element of portable scanning device system 100 may monitor the time such as, for example, portable device 150 or docking station 130. Portable scanning device system 100 may determine if the time the reminder was set for is now. This may occur at step 606. As shown, if the time the reminder is set for is not now, portable scanning device system 100 may continue to monitor the time. If the time the reminder was set for is now, portable scanning device system 100 may notify the user. Notification may be visually or audibly presented to the user via, for example, output device 210 or 252, or output device 304. Notification may also be in the form of an e-mail, an instant message, or any other suitable form, sent to the user. This may occur at step 608. This example is merely illustrative. Any suitable steps may be used to set a reminder and notify a user. Any suitable subsequent action may also occur at step 512.

Figure 7:
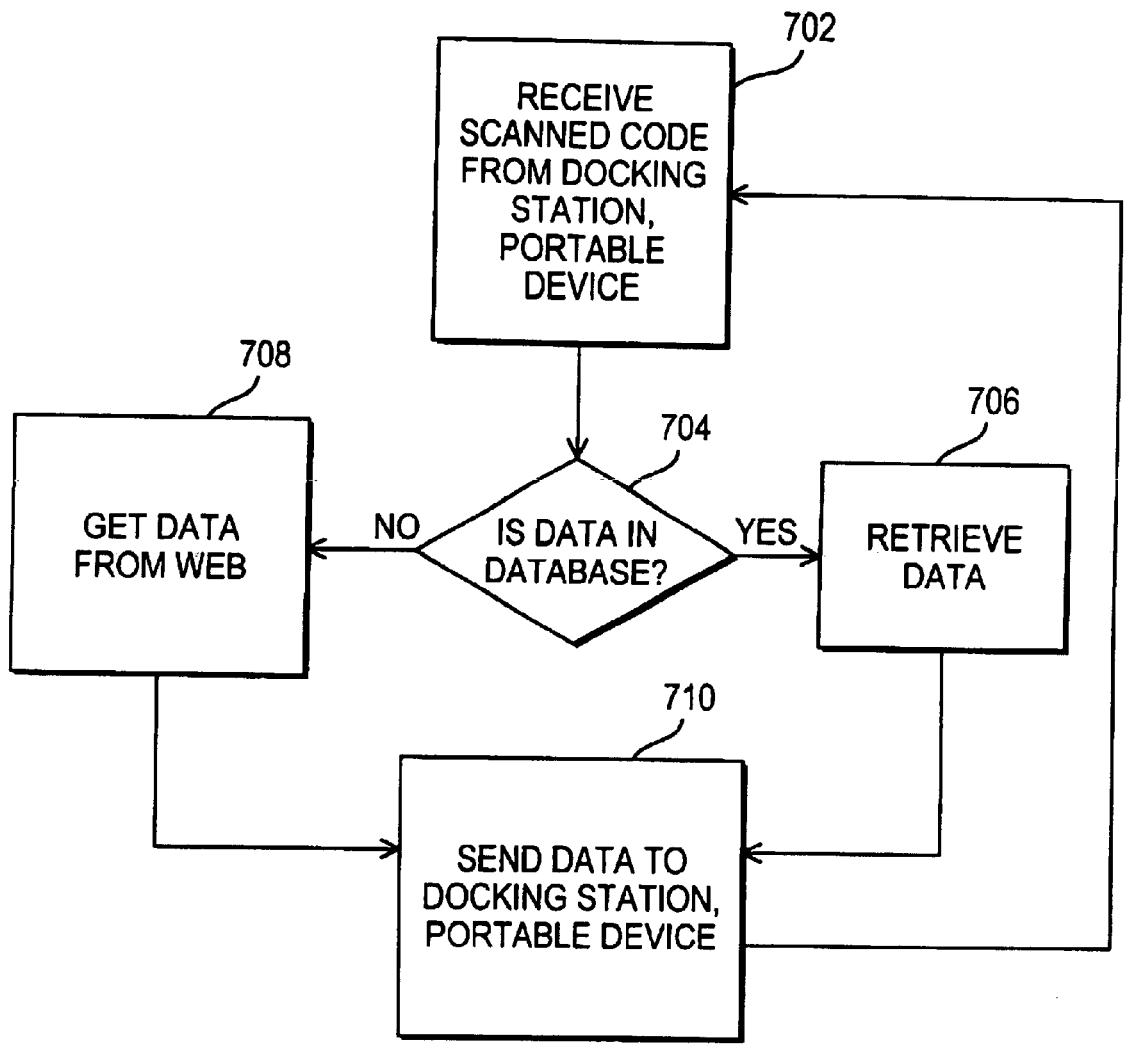
FIG. 7 is a flow chart of illustrative steps involved in a remote site retrieving data associated with scanned codes in accordance with the principles of one embodiment of the present invention.

As shown in the illustrative flow chart of FIG. 7, when remote site 110 receives scanned codes from docking station 130 or a portable user device 150, information associated with the scanned codes may be retrieved and sent to docking station 130 or a portable user device 150. At step 702, remote site 110 may receive a scanned code from docking station 130 or portable user device 150. Portable scanning device system 100 may then determine if information associated with the scanned code is stored locally (e.g., in database 114). This may occur at step 704. If information associated with the scanned code is local, portable scanning device system 100 may retrieve the local information. This may occur at step 706. If, information associated with the scanned code is not local, portable scanning device system 100 may retrieve the information from, for example, the web. This may occur at step 708. When information associated with a scanned code is retrieved, that information may be sent to docking station 130 or a portable user device 150. This may occur at step 710.

Figure 8:
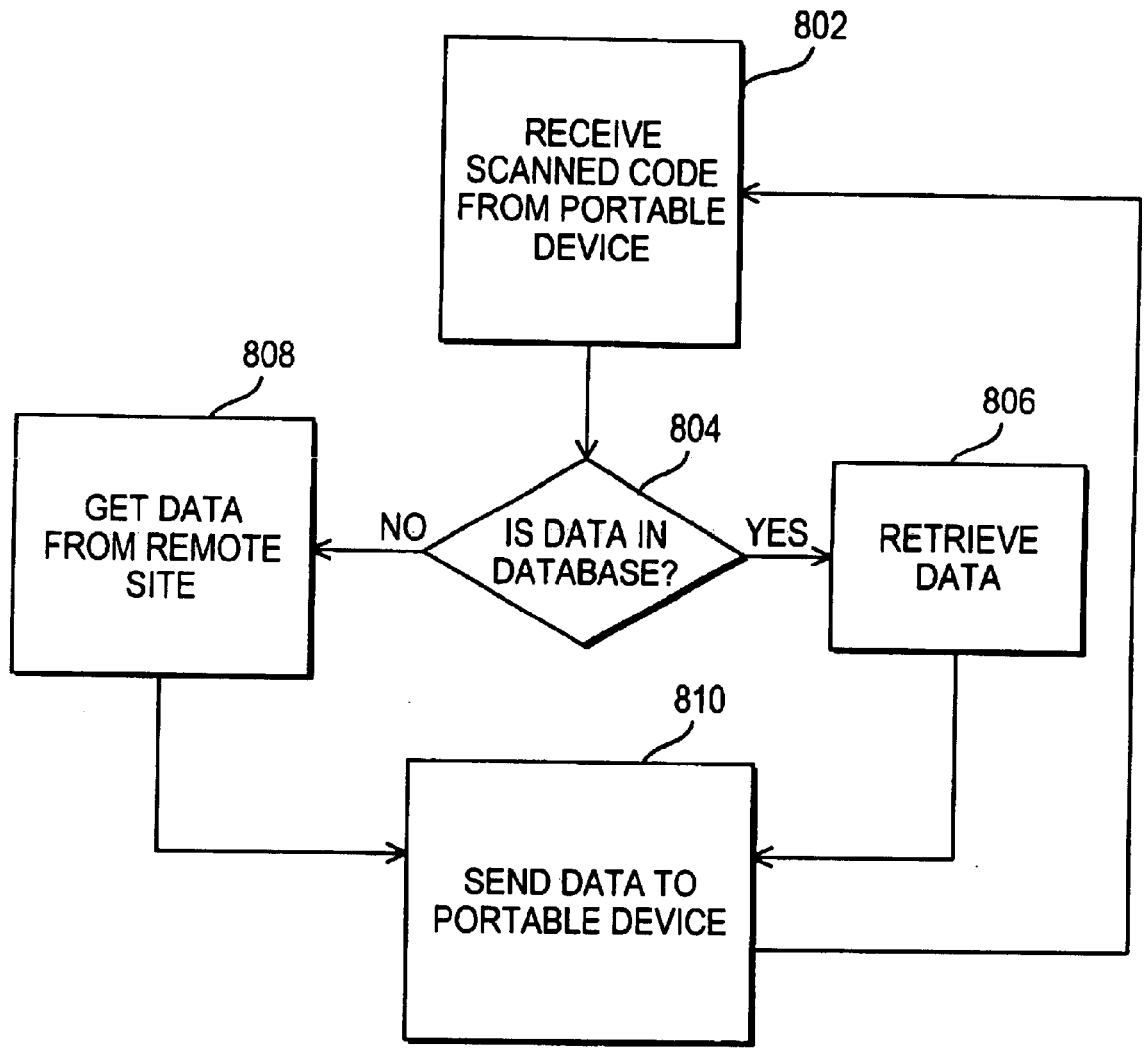
FIG. 8 is a flow chart of illustrative steps involved in a docking station retrieving data associated with scanned codes in accordance with the principles of one embodiment of the present invention.

As shown in the illustrative flow chart of FIG. 8, when docking station 130 receives scanned codes from portable user device 150, information associated with the scanned codes may be retrieved and sent to portable user device 150. At step 802, docking station 130 may receive a scanned code from portable user device 150. Portable scanning device system 100 may then determine if information associated with the scanned code is stored locally at docking station 130. This may occur at step 804. If information associated with the scanned code is stored locally, portable scanning device system 100 may retrieve the local information. This may occur at step 806. If information associated with the scanned code is not local, portable scanning device system 100 may retrieve the information from, for example, a remote site. This may occur at step 808. When information associated with a scanned code is retrieved, that information may be sent to portable user device 150. This may occur at step 810.

These flow charts are merely exemplary. Portable scanning device system 100 may retrieve information to implement portable scanning device system 100 from any suitable equipment in any suitable way.

Portable scanning device system 100 may provide display screens to present information, and abilities and opportunities associated with the information. Display screens may be provided on output device 304 at portable device 150, output device 210 or 252 at docking station 130, or any other suitable output device.

Figure 9:
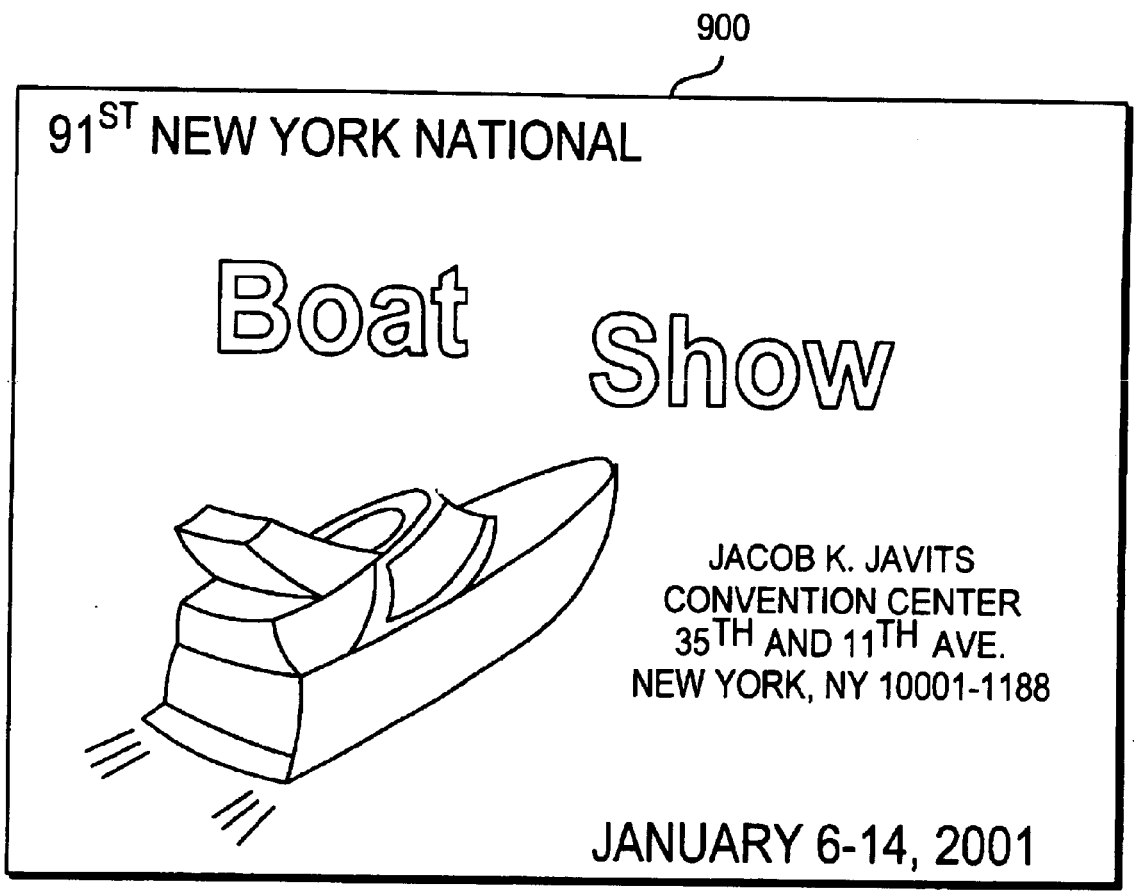
FIG. 9 shows an illustrative display screen in which information associated with an event is presented to the user in accordance with the principles of one embodiment of the present invention.

One such display screen is illustrative display screen 900 of FIG. 9. As shown in illustrative display screen 900, the user of portable scanning device system 100 may have scanned a code associated with an event. The code may have been scanned from an event guide, and advertisement, a newspaper, a periodical, a web-page, a television broadcast, or from any other suitable source. As shown in illustrative display screen 900, information associated with the event may be presented to the user. This information may be communicated to docking station 130 or a portable device 150 from remote site 110. As shown in FIG. 9, information regarding the event (e.g., date, time, location, etc.) may be provided. For example, the event may be a made-for-TV movie. Information such as when the movie is going to be broadcast, on what channel the movie is going to be broadcast, or any other suitable information may be provided in response to the user scanning a code associated with the movie. Any suitable information may be provided to inform the user of portable scanning device system 100 about the event. Portable scanning device system 100 may also provide options related to the event. Such options may include, for example, setting a reminder, confirming or declining an invitation, requesting more information about the event, purchasing the event, or any other suitable option. The user of portable scanning device system 100 may select these options and be presented with information or opportunities associated with these options.

Portable scanning device system 100 may be used to scan codes associated with television programs and television series. These codes may be printed in any publication such as television scheduling guides, newspapers, periodicals, brochures, print-outs of web-pages, or any other suitable printed publication. Codes from a promotion broadcast as part of a television signal may also be scanned. Codes and information associated with codes may also be acquired from any other suitable source (e.g., from other portable devices 150). When portable device 150 is used to scan codes associated with television programs or television series, the user of portable scanning device system 100 may schedule the recording of programs or series as well as perform any other function related to the programs or series. In response to a code associated with television programs or television series being scanned, a display screen such as illustrative display screen 1000 of FIG. 10 may be presented.

Figure 10:
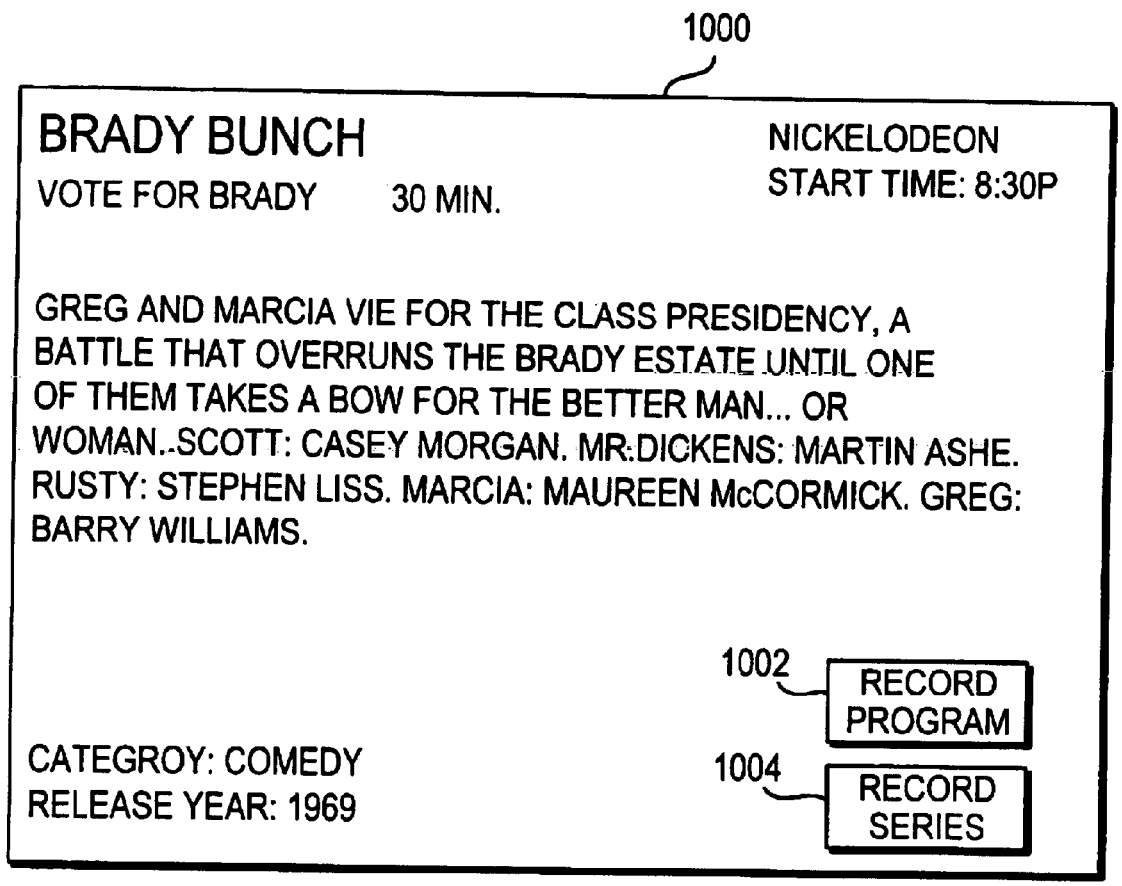
FIG. 10 shows an illustrative display screen in which a user may schedule the recording of programs or series of programs in accordance with the principles of one embodiment of the present invention.

As shown, program information associated with scanned codes may be presented. This information may include the title of the program, the length of the program, a brief description of the program, the stars of the program, the air time of the program, a local channel that the program is to be broadcast on, or any other suitable information. As also shown in FIG. 10, the user of portable scanning device system 100 may schedule the recording of programs or series. An option such as option 1002 may be provided to schedule the recording of a program. Upon selection of option 1002, portable scanning device system 100 may schedule the recording of the program. An option such as option 1004 may also be provided to schedule the recording of a series. Upon selection of option 1004, portable scanning device system 100 may schedule the recording of the series associated with the scanned code. Options 1002 and 1004 may also be used to un-schedule the recording of a program or series, respectively. For example, if the user had previously scheduled the recording of a program, the user may select option 1002 to un-schedule the recording of that program.

Options other than options 1002 and 1004 may also be presented. Selecting these options may perform other functions related to the programs or series. For example, the user may purchase an authorization for a television program or series. Such authorization may be required to, for example, view a pay-per-view program. An option to present a television program may also be presented. The television program may be presented on, for example, output device 210, 252 or 304. The television program may be presented in response to a user selecting an option to have the television program presented, or automatically in response to the user scanning a code associated with the television program. Any suitable option may be presented on any suitable output device. Any suitable function may be performed in response to an option being selected. Multiple options may be presented simultaneously.

When a program is about to begin, portable scanning device system 100 may send a signal to a remote server or user equipment (not shown) to initiate recording. The signal may be sent, for example, by the portable device or the docking station. Such suitable user equipment may be personal video recorders (e.g., TiVo™, ReplayTV™), writeable DVDs, writeable CDs, hard disk drives, VCRs, or any other suitable user equipment. Upon receipt of the signal, the remote server or user equipment may begin recording the program. In another suitable embodiment, the remote server or user equipment may have previously received the signal to record a program. A database of programs to be recorded may be stored at the remote server or user equipment. In another suitable approach, the database may be stored in a storage device coupled to the remote server or user equipment to record the program. For example, the database of programs to be recorded may be stored on database 208 at docking station 130.

Figure 11:
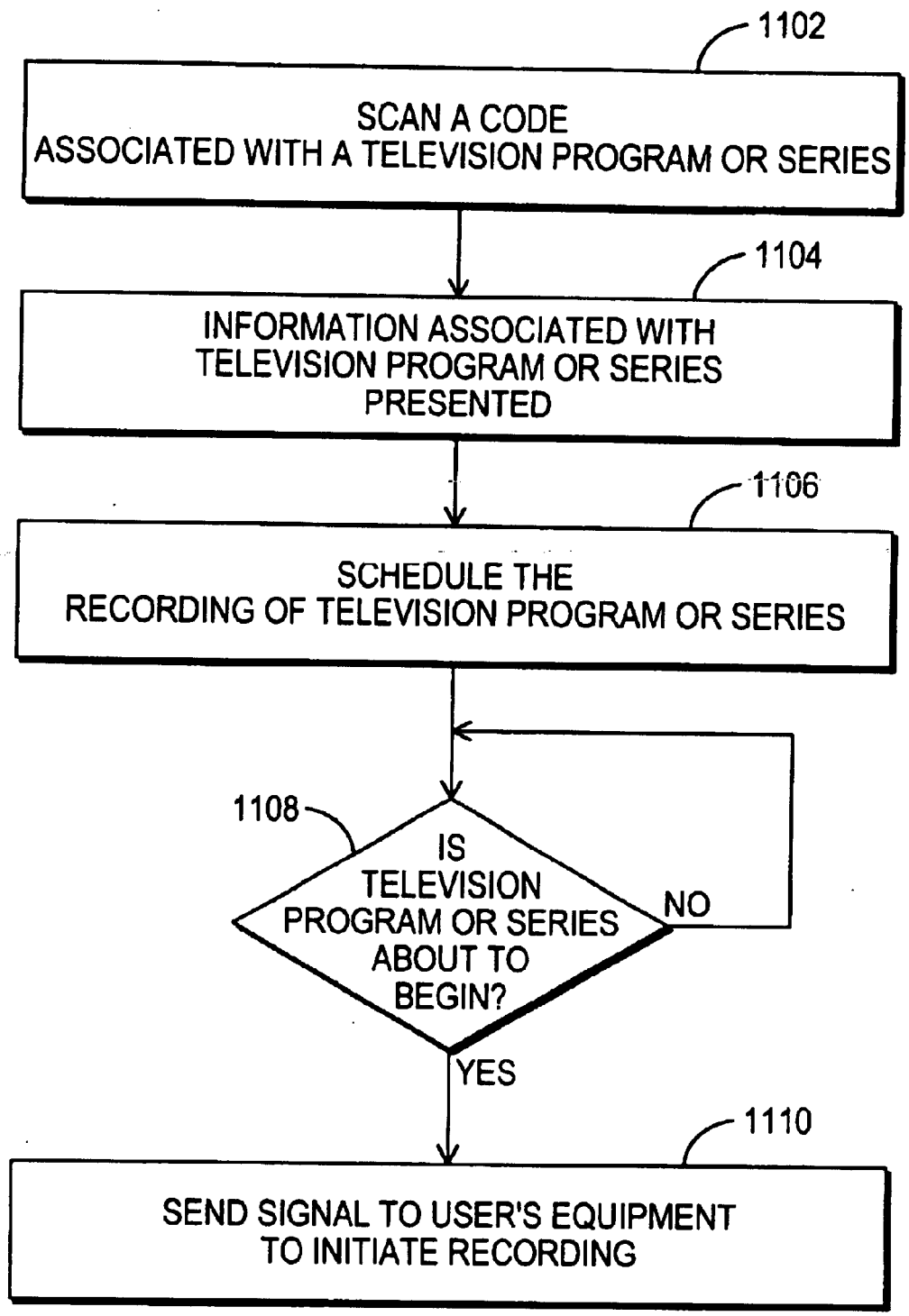
FIG. 11 is a flow chart of illustrative steps involved in scheduling the recording of a television program or series in accordance with the principles of one embodiment of the present invention.

As shown in the illustrative flow chart of FIG. 11, the user of portable scanning device system 100 may schedule the recording of a television program or series. When a television program that was scheduled to be recorded is about to begin, a signal may be sent to a remote server or user equipment to initiate recording. At step 1102, the user of portable scanning device system 100 may scan a code associated with a television program or series. At step 1104, information associated with the associated television program or series may be presented. The user of portable scanning device system 100 may schedule the recording of a television program or series. This may occur at step 1106. At step 1108, portable scanning device system 100 may make a determination if the program or series is about to begin. As shown, if the program or series is not about to begin, portable scanning device system may determine again if the television series or program is about to begin. When the television series or program is about to begin, portable scanning device system 100 may send a signal to a remote server or user equipment to initiate the recording of the television program or series. This may occur at step 1110.

The flow chart shown in FIG. 11 is merely exemplary. Any suitable approach to schedule the recording of television programs and series and to initiate the recording of television programs and series may be used. For example, when a user schedules the recording of a television program or series, portable scanning device system 100 may immediately send a signal to the appropriate remote server or user equipment indicating which television programs or series to record and when they air. When the appropriate program is about to begin, the remote server or user equipment may automatically record the program without any input from portable scanning device system 100.

Figure 12:
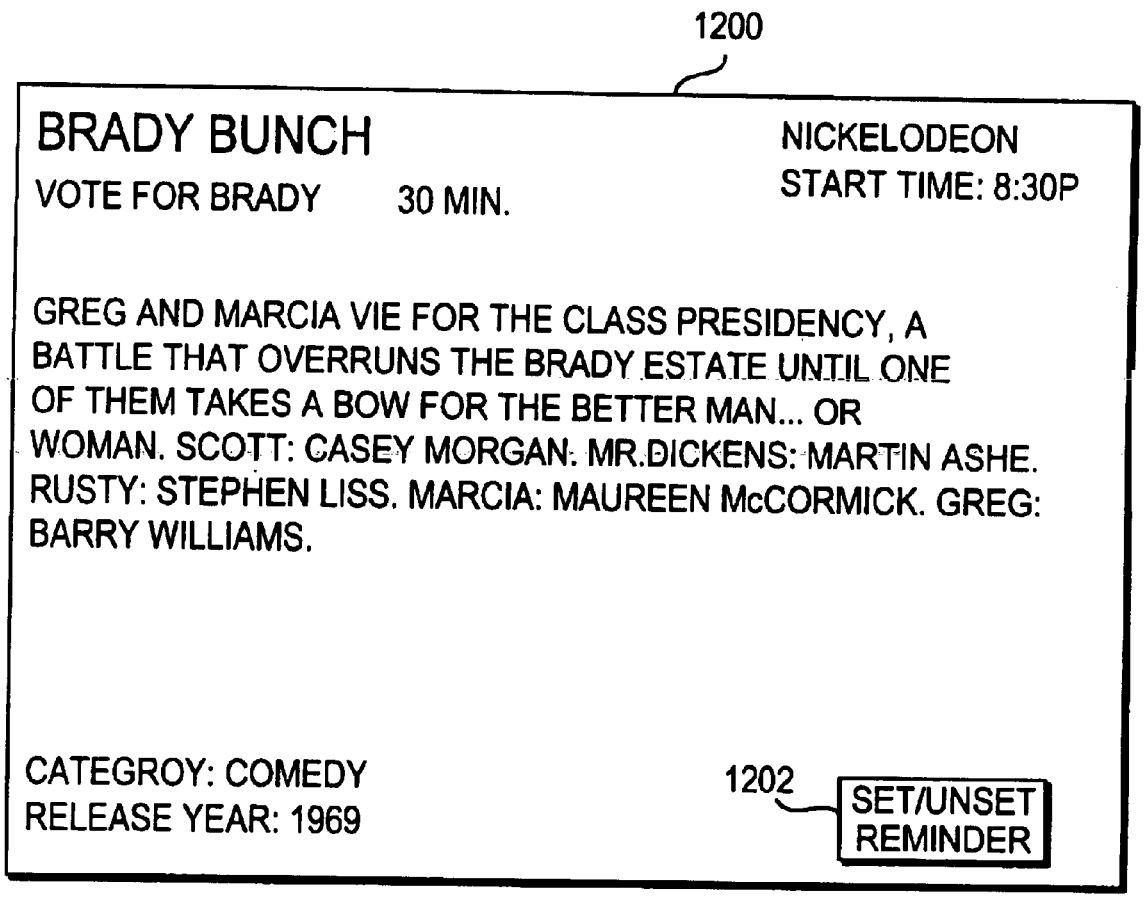
FIG. 12 shows an illustrative display screen in which a user may set and un-set reminders in accordance with the principles of one embodiment of the present invention.

As shown in FIG. 12, the user of portable scanning device system 100 may set and un-set reminders for programs (e.g., television programs), future events, daily events, more than one occurrence of an event, tasks, and any other suitable occurrence. As shown in illustrative display screen 1200, for example, the user of portable scanning device system 100 may set co and un-set reminders (e.g., for the start of a television program). An option such as option 1202 may be provided to set and un-set a reminder. Upon selection of option 1202, portable scanning device system 100 may set or un-set a reminder. Options may also be presented to set reminders for series, or to perform other functions related to the event.

When a code associated with an event, for example, is scanned, portable scanning device system 100 may display information associated with that event. This information may include any suitable information associated with the scanned code. For example, if the scanned code were associated with a concert, a promotion for the performers, show dates, advertisements, and any other suitable information may be displayed. The user of portable scanning device system 100 may set or un-set a reminder for such an event.

Information for a daily task may also be presented. For example, if the user scanned a code associated with dental health in a health journal, the user of portable scanning device system 100 may set and un-set a reminder for a daily task such as brushing one's teeth. Advertisements (e.g., advertisements for a particular brand of tooth paste) associated with the task may also be displayed.

Figure 13:
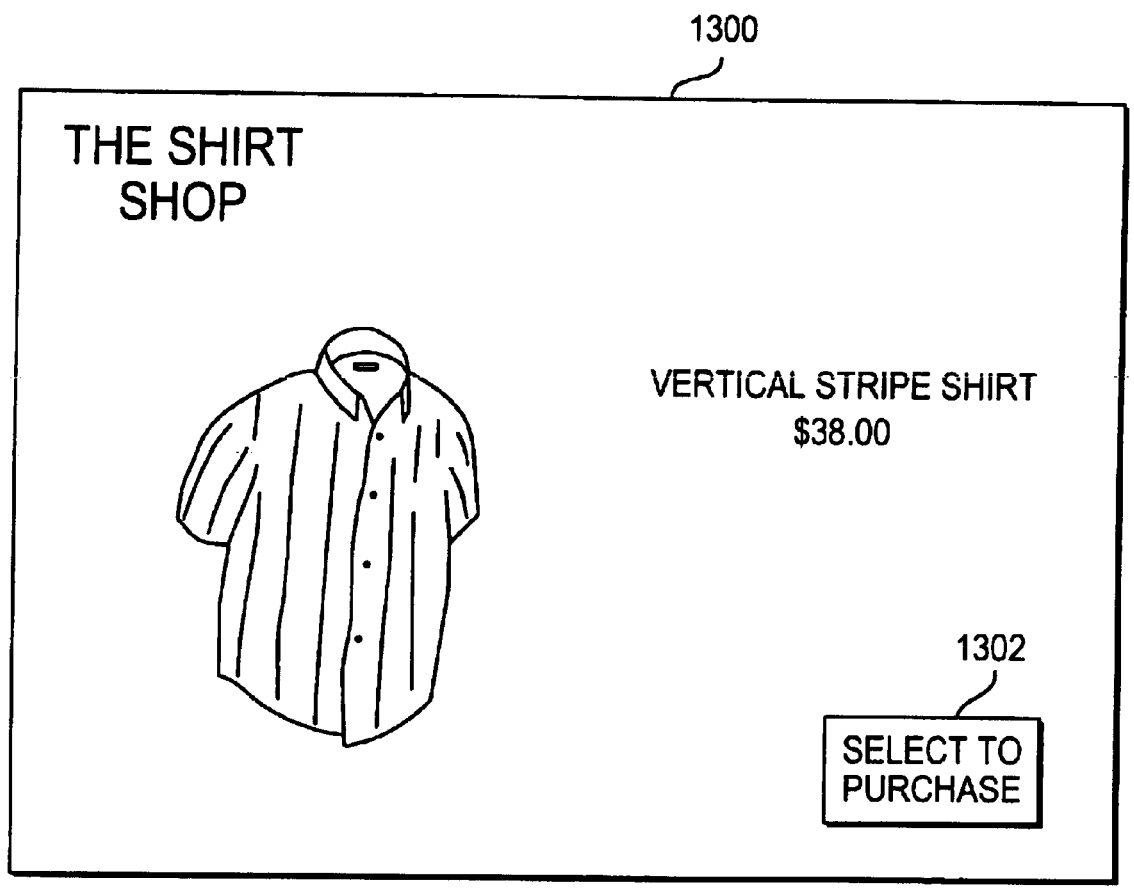
FIG. 13 shows an illustrative display screen in which a user may purchase products, goods, or services associated with a code in accordance with the principles of one embodiment of the present invention.

As shown in FIG. 13, the user of portable scanning device system 100 may purchase products, goods, or services associated with a scanned code. When portable device 150 is used to scan codes for which the user may desire to purchase products, goods, or services, a display screen such as illustrative display screen 1300 of FIG. 13 may be displayed.

As shown, any suitable information associated with the scanned codes may be presented. For example, if the scanned code were associated with movie listings or promotions, concert promotions, exhibit promotions, or promotions or listings associated with other scheduled events, a promotion, show dates, advertisements, and any other suitable information associated with the scanned code may be displayed. This information may include, for example, schedules, seating availabilities, or ticket prices for these events. As shown in FIG. 13, portable scanning device system 100 may provide an option to purchase products, goods, or services associated with the scanned code. Such an option may be option 1302. By selecting option 1302, the user of portable scanning device system 100 may purchase, for example, tickets for a concert and merchandise associated with a performance group. Similarly, personal scanning device system 100 may be used to order, for example, pay-per-view movies or order any other VOD or NVOD service.

Option 1302 is merely exemplary. Any other suitable option may be presented and any other suitable function may be performed in response to an option being selected. Other options that may be presented related to the product, good, or service may be options to, for example, request more information, request a demo/sample/test drive, add a product, good, or service to a wish list or gift registry, add a product, good, or service to a "consider" list, add a product, good, or service to a "comparison shopping list," find local availability and pricing, get directions to a local merchant, see size/color/other options, request a price alert if a product, good, or service is available below a specified price, or bid on a product, good, or service.

The user of portable scanning device system 100 may scan codes while shopping in a mall, grocery store, clothing store, etc. (e.g., in catalogs, on food packages, on clothing labels, etc.) The user of portable scanning device system 100 may also scan codes while in the home. Codes may also be scanned from advertisements in newspapers, periodicals, on a television screen, or in any other suitable location. Codes may also be acquired from another portable device 150.

In response to scanning or acquiring a code, the user of portable device 150 or docking station 130 may purchase the products, goods, or services associated with the scanned codes remotely, or perform other functions related to the products, goods, or services. If desired, portable device 150 or docking station 130 may periodically query the merchants' web-sites to determine if the products, goods, or services associated with the scanned codes are on sale (i.e., sold at a price lower than their normal price), if the merchants are having sales in general, or if the user can purchase products, goods, or services for a lower price on-line than in a store. Portable scanning device system 100 may notify the user of a sale or availability of the lower price. The user may purchase the product, good, or service at the lower price.

Figure 14:
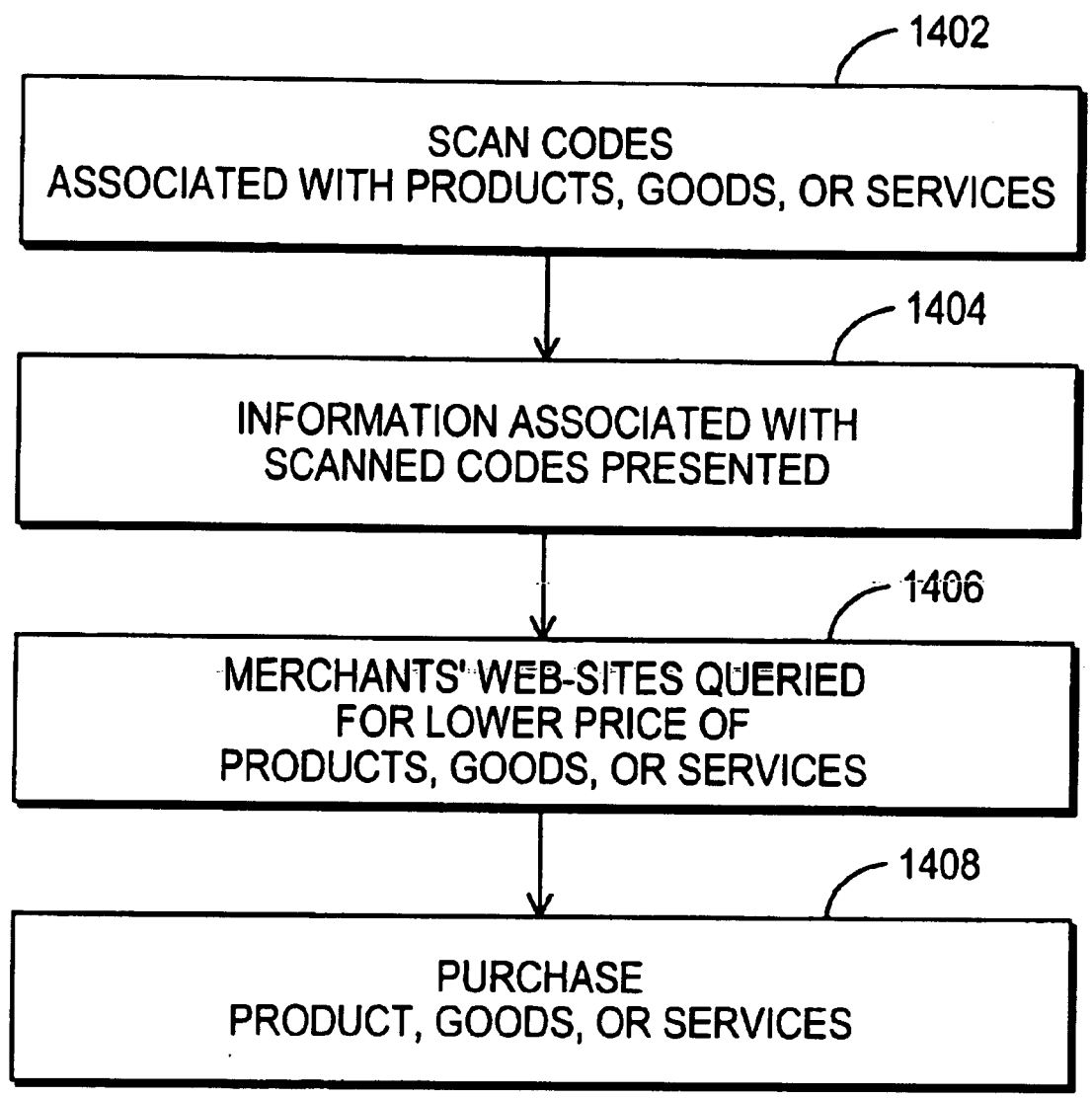
FIG. 14 is a flow chart of illustrative steps involved in purchasing products, goods, or services associated with a code in accordance with the principles of one embodiment of the present invention.

As shown in the illustrative flow chart of FIG. 14, the user of portable scanning device system 100 may scan codes associated with products, goods, or services and purchase those products, goods, or services. At step 1402, the user of portable scanning device system 100 may scan codes associated with products, goods, or services. At step 1404, information associated with the scanned codes may be presented to the user. At step 1406, merchants' web-sites may be queried to determine if a good, service, or product may be purchased for a lower price. At step 1408, the user of portable scanning device system 100 may purchase products, goods, or services. This illustrative flow chart is merely exemplary. The user of portable scanning device system 100 may purchase or perform other functions related to products, goods, or services associated with scanned codes in any suitable way.

In another aspect of the invention, portable scanning device system 100 may be used to enhance the effectiveness of printed or other promotional material. In response to scanning a code, portable scanning device system 100 may obtain promotional media, such as text, graphics, audio, video, animations, or any other suitable media, associated with the scanned code. Promotional media may be communicated to portable device 150, docking station 130, or any other suitable location from any suitable location. Promotional media may be communicated to and from any suitable locations directly, via communications network 120, or by any means not shown.

Figure 15:
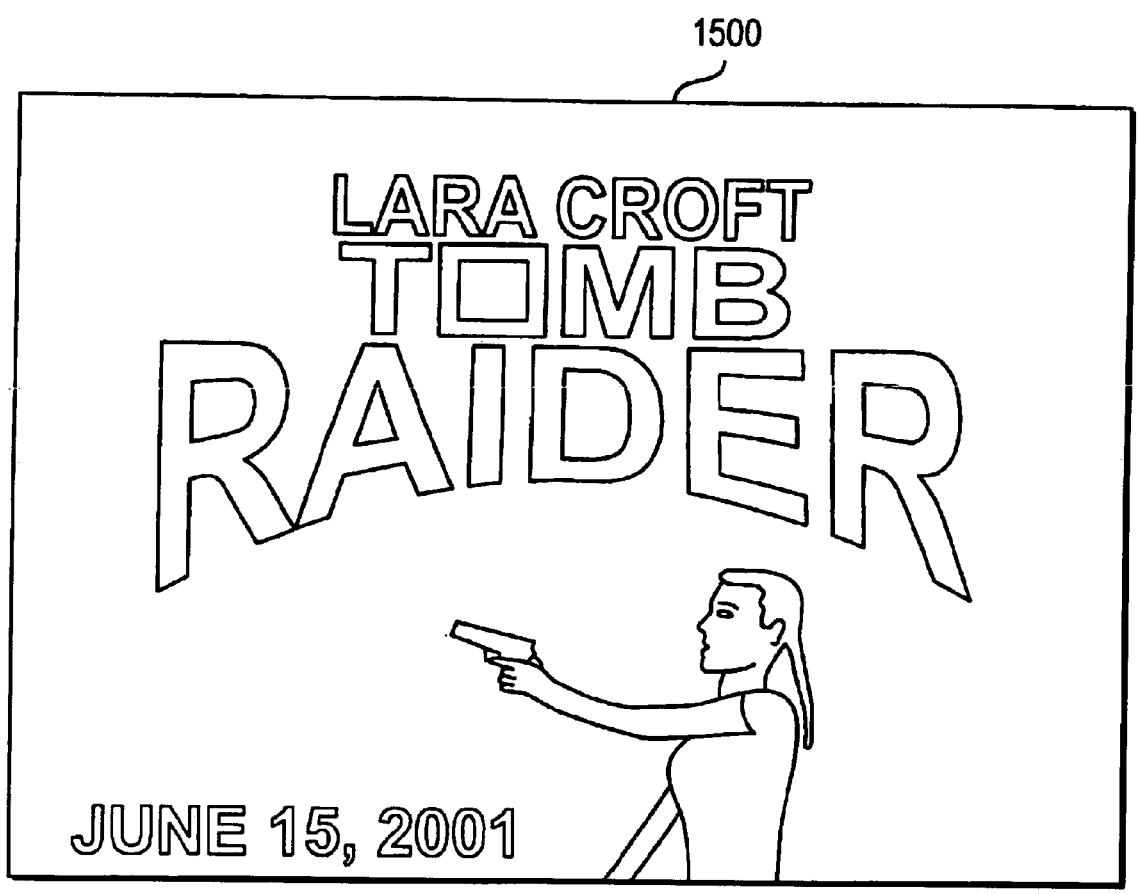
FIG. 15 shows an illustrative display screen in which enhanced information associated with a code is presented to the user in accordance with the principles of one embodiment of the present invention.

As shown in illustrative display screen 1500 of FIG. 15, for example, video information such as a trailer for a movie may be presented. Portable scanning device system 100 may provide a trailer for a movie when a code associated with a movie is scanned. This information may enhance the overall effectiveness of the advertisement. As another example, when a code associated with a children's cartoon is scanned (e.g., a code printed in a television program guide), an advertisement with animated cartoon characters may be provided. Display screen 1500 may include options to perform functions related to the scanned code.

Portable scanning device system 100 may be used to schedule the use of facilities (e.g., conference rooms, lecture halls, workrooms, etc.) and equipment (e.g., computers, overhead projectors, etc.). Codes associated with the facilities and equipment may be scanned. Codes associated with facilities may be placed on, for example, the doorways of facilities. Codes associated with facilities may also be printed on maps. Codes associated with equipment may be placed on the equipment. In another suitable approach, codes associated with facilities and equipment may be printed in a journal to log the use of facilities and equipment.

In response to a code associated with a facility or equipment being scanned, portable scanning device system 100 may obtain the upcoming schedule of use for the facility or equipment. Schedules of use for facilities or equipment may be stored in a database at any suitable location such as remote site 110.

Figure 16:
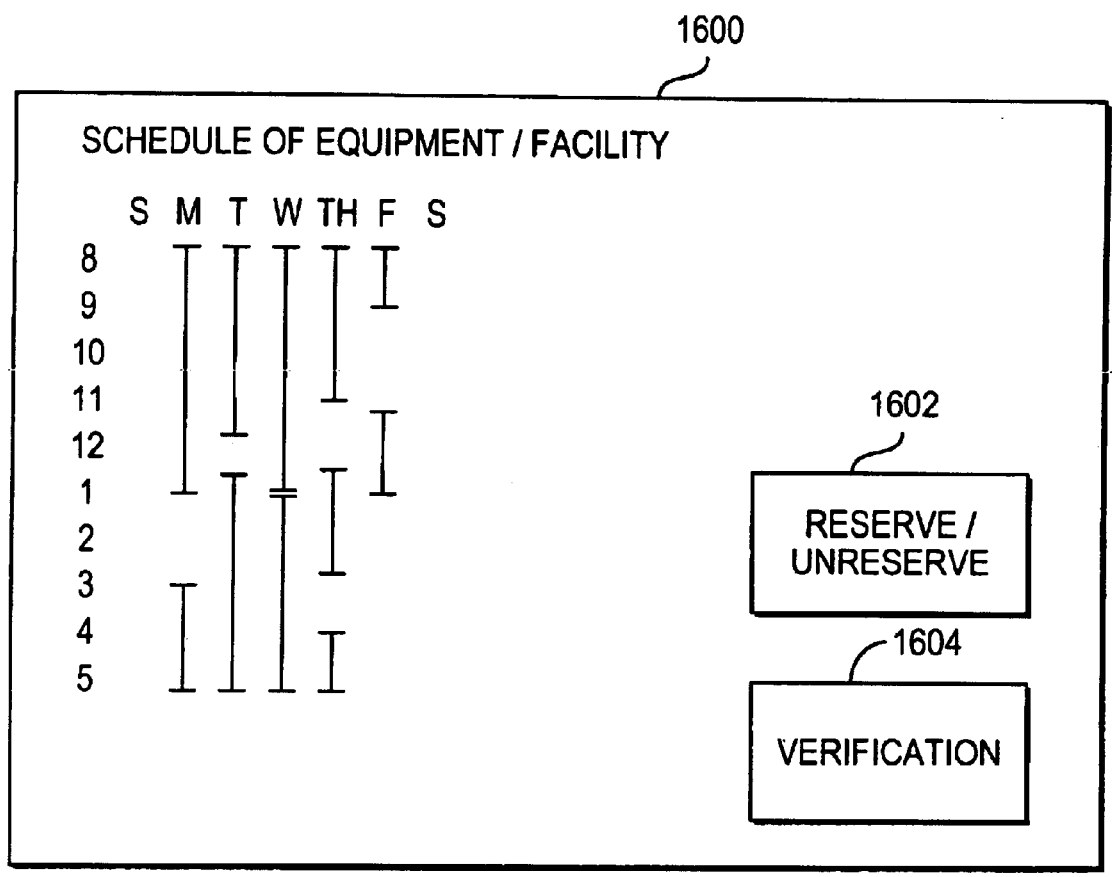
FIG. 16 shows an illustrative display screen in which the user may schedule the use of equipment and facilities in accordance with the principles of one embodiment of the present invention.

The user of portable scanning device system 100 may schedule the use of the facility or equipment. As shown in illustrative display screen 1600 of FIG. 16, portable scanning device system 100 may present the schedule of the facility or equipment associated with the scanned code. The user may enter the time range for the reservation by, for example, entering a date and start/end time, by selecting an on-screen region corresponding to the desired time range, or using any other method. The user of portable scanning device system 100 may reserve and un-reserve a facility or equipment by, for example, selecting reserve/un-reserve a facility or equipment option 1602. The use of equipment and facilities may automatically be reserved or un-reserved in response to the user selecting reserve/un-reserve option 1602. In another suitable approach, the user may be required to verify the reserving/un-reserving of equipment or facilities. The user may provide verification to portable scanning device system 100 by, for example, selecting verification option 1604. Such verification may require entering a code. Verification of a specific user may be based on use of a specific portable device 150 assigned to that user.

Figure 17:
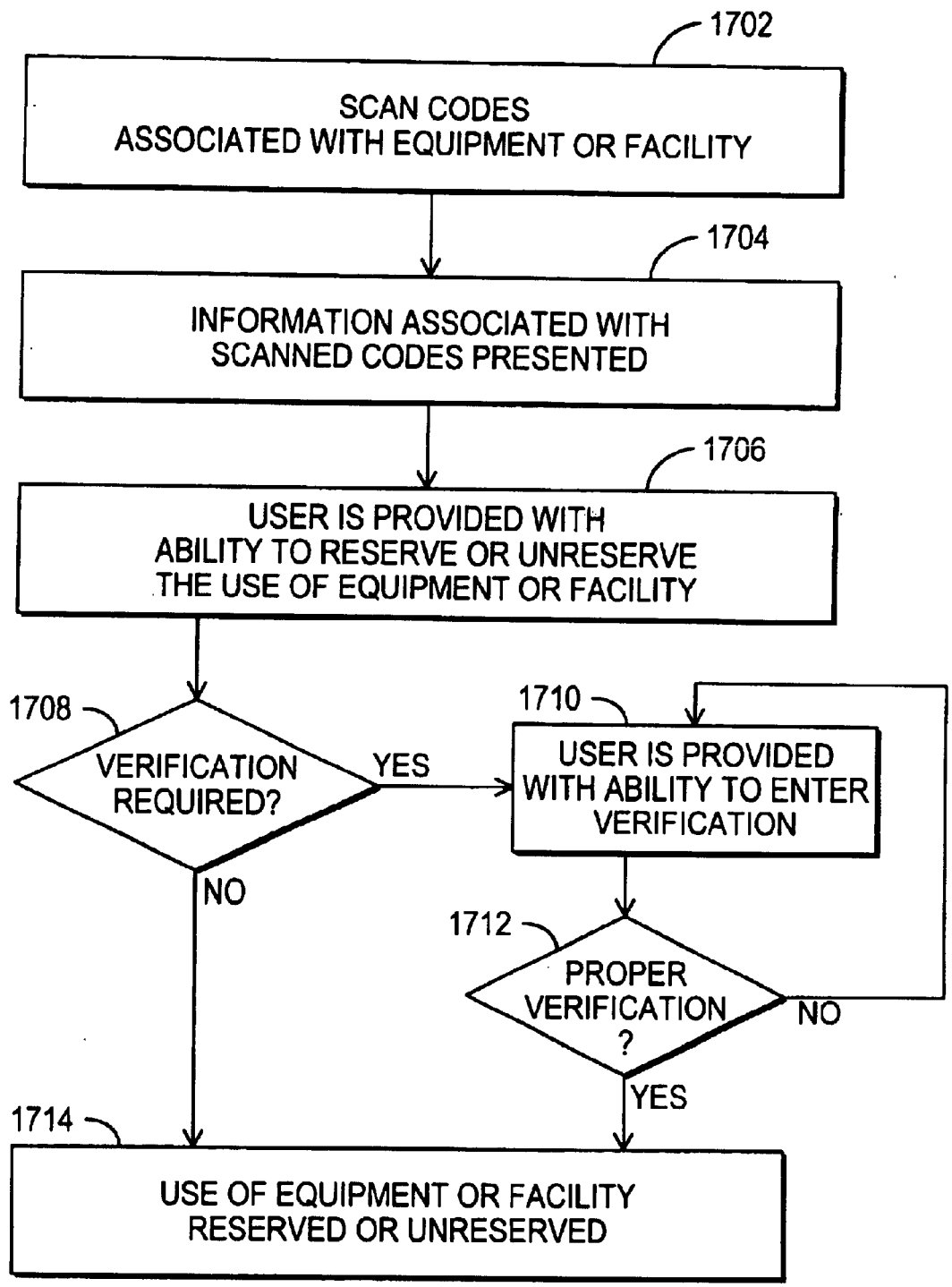
FIG. 17 is a flow chart of illustrative steps involved in scheduling the use of equipment or facilities in accordance with the principles of one embodiment of the present invention.

As shown in the illustrative flow chart of FIG. 17, the user of portable scanning device system 100 may scan codes associated with equipment or facilities and reserve or un-reserve the use of those equipment or facilities. At step 1702, the user of portable scanning device system 100 may scan codes associated with equipment or facilities. At step 1704, portable scanning device system 100 may present information associated with those scanned codes to the user. At step 1706, the user of portable scanning device system 100 may reserve or un-reserve the use of equipment or facilities. At step 1708, portable scanning device system 100 may determine if verification is required to reserve or un-reserve equipment or facilities. As shown, if verification is required, the user of portable scanning device system 100 may enter verification. This may occur at step 1710. At step 1712, portable scanning device system 100 may determine if the proper verification were entered. If the proper verification were not entered, the user of portable scanning device system 100 may enter verification again. When the proper verification is entered or if verification were not required, portable scanning device system 100 may reserve or un-reserve the use of equipment or facilities. This may occur at step 1714. This flow chart is merely illustrative. Any suitable way to reserve or un-reserve the use of equipment or facilities may be used.

In one suitable embodiment of the present invention, the user of portable scanning device system 100 may scan codes associated with Universal Resource Locators (URLs). For example, print-outs of web-pages may be automatically labeled with codes by a web-browser running on portable device 150 or docking station 130. The code may indicate the URL of the printed page. In response to the user scanning the code, the portable device may automatically launch a web-browser and access the page via the URL. This may relieve the user of having to launch the browser and manually enter the URL. If desired, any link within a web-page may have a code associated with it. The user may scan a code associated with a link and automatically go to the linked resource.

Figure 18:
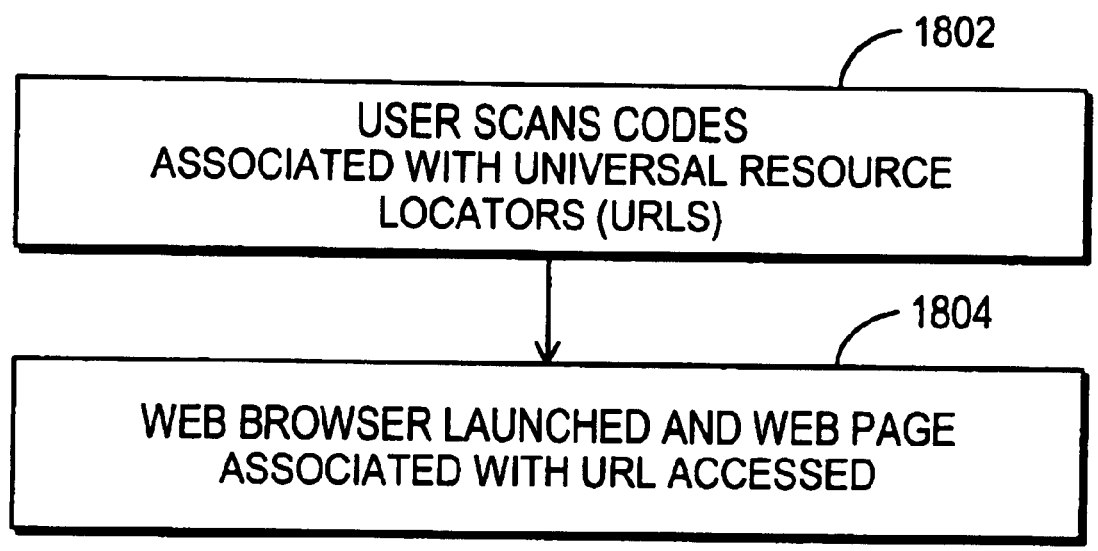
FIG. 18 is a flow chart of illustrative steps involved in scanning a code of a Universal Resource Locator ("URL") and have the web-page associated with that URL be accessed in accordance with the principles of one embodiment of the present invention.

As shown in the illustrative flow chart of FIG. 18, the user of portable scanning device system 100 may scan a code associated with a URL. This may occur at step 1802. In response to a user scanning a code associated with a URL, a web-browser may be launched, and a web-page associated with the URL may be accessed. This may occur at step 1804.

In a further aspect of the invention, users of portable scanning device system 100 may scan codes associated with articles in newspapers or other periodicals. Portable device 150 or docking station 130 may then access a web document associated with the article and provide the user with information that supplements the content of the article. In another suitable approach, portable device 150 or docking station 130 may obtain supplemental information and present the information to the user. In this way, publishers may direct the users to web-sites or other electronic documents associated with the original printed publication. The web-sites and other electronic documents may be used to provide additional advertising and purchase opportunities, if desired.

In a further aspect of the invention, translations of text may be provided to the user of portable scanning device system 100 in response to the user scanning a code. People who do not understand the language in which material is printed, or if they would prefer the material to be presented in a different language, may scan the code associated with that printed material. Information associated with the scanned code in the language of the user may be communicated to portable device 150, docking station 130, or any other suitable location from any suitable location. Information may be stored and communicated in multiple languages. Alternatively, the information may be stored in a single language and may be automatically translated. The preferred language of the user may be pre-defined as a user setting, or the user may determine in what language information is to be presented. As shown in illustrative display screen 1900 of FIG. 19, translated information associated with a code may be presented.

Figure 19:
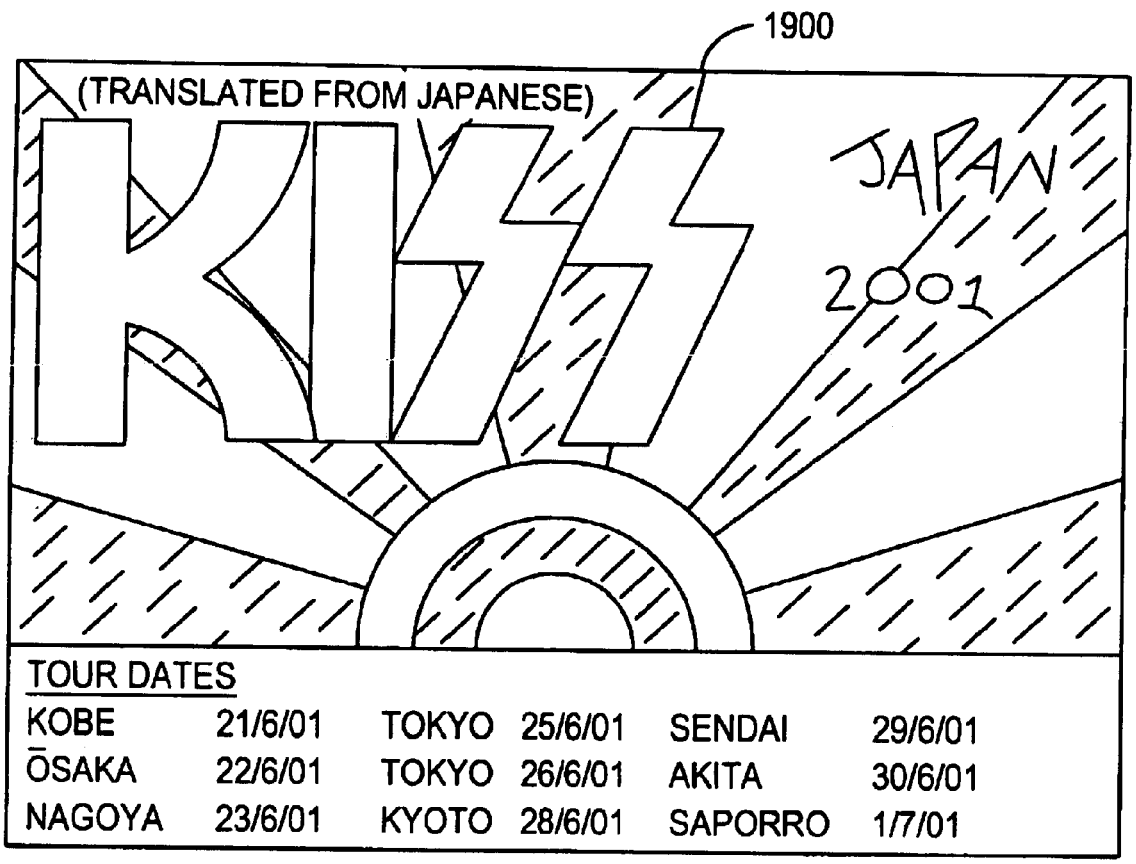
FIG. 19 shows an illustrative display screen in which translated information associated with a code is provided in accordance with the principles of one embodiment of the present invention.

FIG. 19 is merely exemplary. Translated information may be provided in response to any suitable code being scanned. Codes may be scanned from printed media and signs in public places, such as maps, street signs, addresses, public announcements, restaurant menus, or any other suitable location or medium. For example, in response to a code that is associated with a foreign television program being scanned (the code is printed in, for example, a television program guide), information associated with the foreign television program may be presented to the user in a language that is pre-defined by the user. Translated information may be provided in response to any suitable code being scanned. Such suitable codes may include two-dimensional codes that have translated text in the code.

Figure 20:
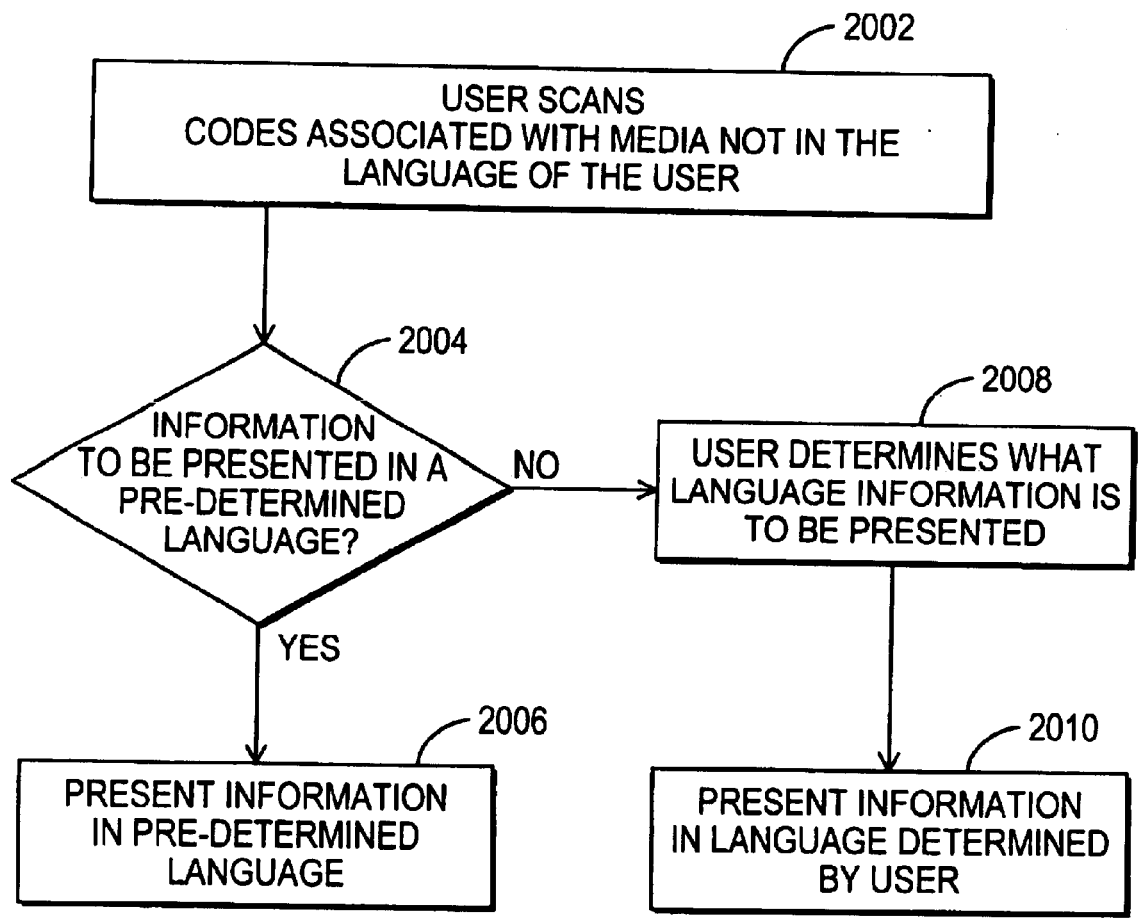
FIG. 20 is a flow chart of illustrative steps involved in presenting translated information associated with a scanned code in accordance with the principles of one embodiment of the present invention.

As shown in the illustrative flow chart of FIG. 20, portable scanning device system 100 may provide information associated with a scanned code in a pre-determined language or a language determined by the user. At step 2002, the user of portable scanning device system 100 may scan codes associated with media not in the preferred language of the user. At step 2004, portable scanning device system 100 may determine if information is to be presented in a pre-determined language. As shown, if information is to be presented in a pre-determined language, portable scanning device system 100 may present the information to the user in the preferred language of the user. This may occur at step 2006. If, at step 2004, portable scanning device system 100 determined that information was not to be presented in a pre-determined language, the user of portable scanning device system 100 may determine in what language information is to be presented. This may occur at step 2008. At step 2010, portable scanning device system 100 may present information in the language determined by the user. Steps 2006 and 2010 may include the sub-steps of obtaining translated information or automatically translating information into a preferred language. This flow chart is merely exemplary. Any suitable way to present information in a pre-determined language or a language determined by the user may be used.

The user of portable scanning device system 100 may scan more than one code before information associated with codes is acquired. The activity of the user of portable scanning device system 100 may be monitored and logged. For example, portable scanning device system 100 may keep a record of those codes scanned by portable device 150. Codes scanned by portable device 150 may be stored in a storage device or database such as storage device 206, storage device 308, database 208, or database 310.

The user of Portable scanning device system 100 may select which scanned code the user would like to acquire more information about. The user of portable scanning device system 100 may select those codes stored in, for example, database 310. When presenting scanned codes for a user to select from, information associated with the scanned code may be displayed. For example, if the scanned code were associated with a T-shirt from a clothing store, a picture of the T-shirt or the brand name of the manufacturer of the T-shirt may be displayed. As another example, if the scanned code were associated with a television program, the logo of the television program may be displayed. By way of this arrangement, the user may readily recall which codes and which products, goods and services, associated with the codes were scanned.

Figure 21:
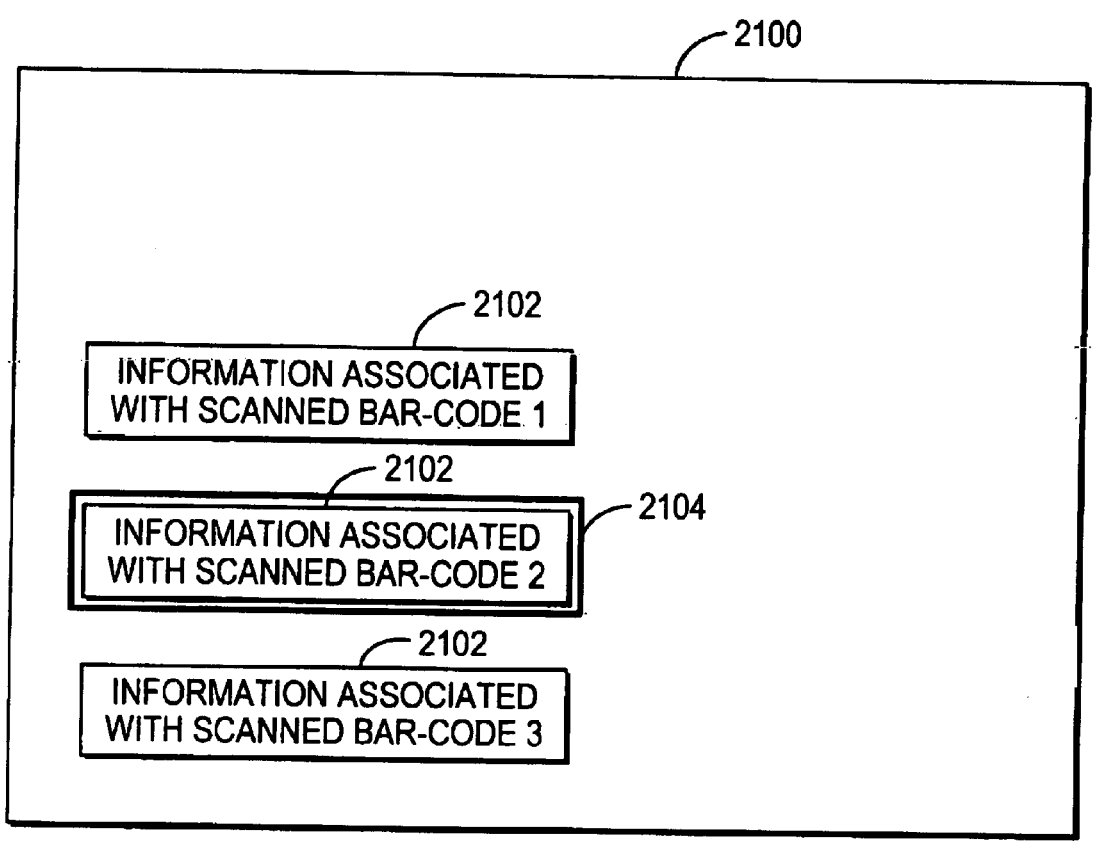
FIG. 21 shows an illustrative display screen in which the user selects which scanned code information is to be acquired.

As shown in illustrative display screen 2100 of FIG. 21, the user scanned three codes. Information associated with scanned codes may be presented to the user in individual selectable regions such as regions 2102. This is merely illustrative. Any suitable way to present information associated with scanned codes may be used. Regions 2102 may be navigated to. As shown in FIG. 21, an indicator such as highlight 2104 may be used to indicate to the user to which region 2102 the user has navigated. Upon navigating to the desired region 2102, the user of portable scanning device system 100 may select that region 2102 and acquire information associated with that code.

Figure 22:
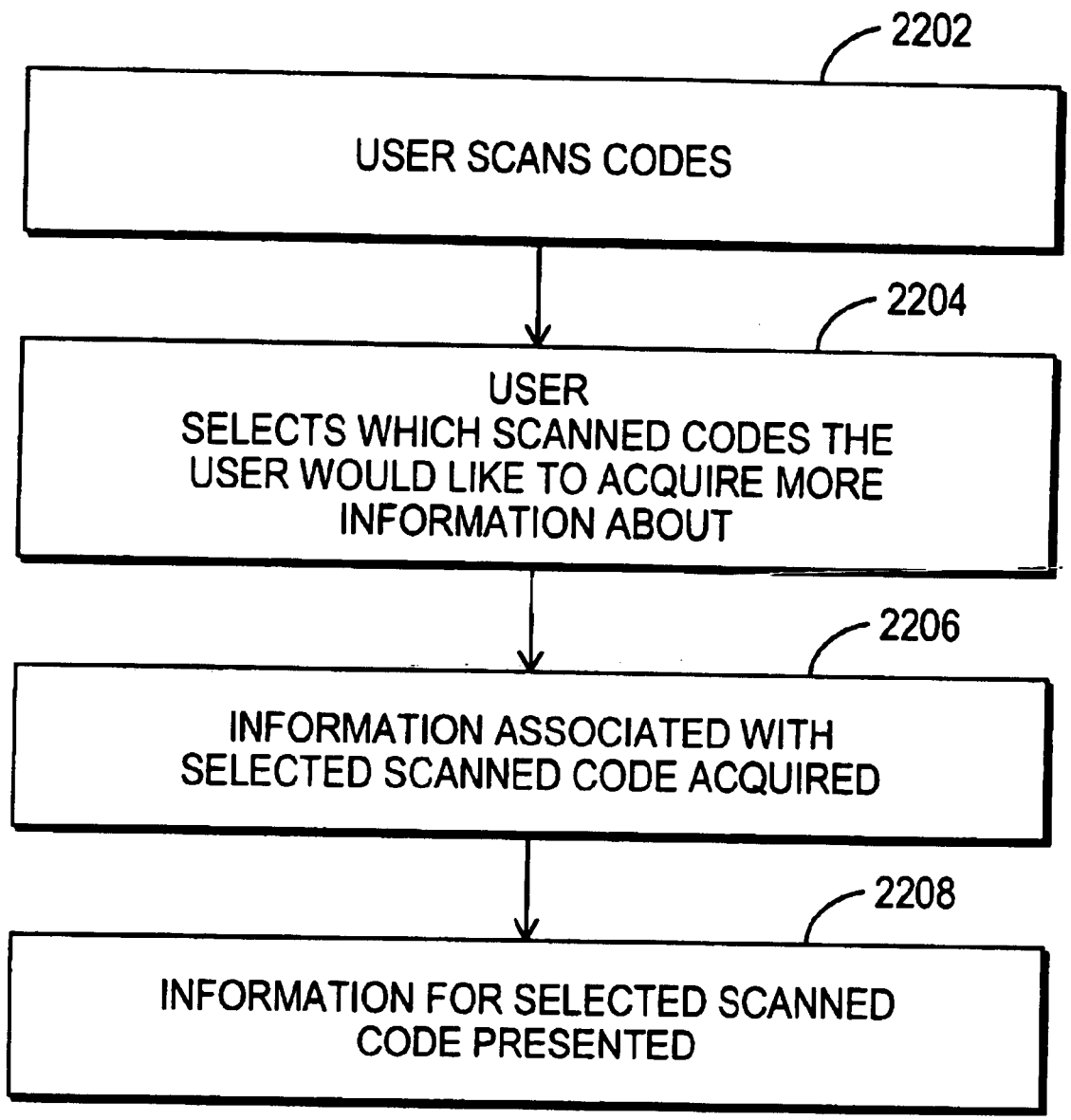
FIG. 22 is a flow chart of illustrative steps involved in presenting information associated with a code selected from a group of scanned codes in accordance with the principles of one embodiment of the present invention.

As shown in the illustrative flow chart of FIG. 22, portable scanning device system 100 may acquire and present information associated with those scanned codes the user selected to acquire more information about. At step 2202, the user of portable scanning device system 100 may scan codes. At step 2204, the user of portable scanning device system 100 may select which scanned codes the user would like to acquire more information about. In response to the user selecting for which code information is to be acquired, portable scanning device system 100 may acquire information associated with the selected scanned code. This may occur at step 2206. At step 2208, portable scanning device system 100 may present information for the selected scanned code. This flow chart is merely exemplary. Any suitable way to acquire and present information for a selected scanned code may be used.

It is to be understood that the preceding figures are merely exemplary of the capabilities and functionality of the present invention. Any order and/or combination of the features described in connection with these figures may be used. For example, the portable scanning device system 100 may present the user with enhanced information associated with a scanned code. Purchase opportunities associated with the scanned code may then be presented to the user.

Thus, systems and methods for using a portable device with code scanner are provided. One skilled in the art will appreciate that the present invention can be practiced by other than the described embodiments, which are presented for purposes of illustration and not of limitation, and the present invention is limited only by the claims which follow.

What is claimed is:

1. A method for using a portable scanning device for acquiring information associated with codes comprising:
   scanning a code using a portable device wherein the portable device comprises code scanning equipment;
   acquiring information associated with the scanned code, wherein the acquired information comprises an upcoming schedule of use of equipment associated with the code; and
   scheduling the use of the equipment.

2. The method of claim 1 further comprising presenting the acquired information to a user at a docking station via an output device at the docking station.

3. The method of claim 1 further comprising presenting the acquired information to a user at the portable device via an output device at the portable device.

4. The method of claim 1 wherein the information is acquired via a wireless path.

5. The method of claim 4 wherein the wireless path is an infrared path.

6. The method of claim 4 wherein the wireless path is a radio frequency path.

7. The method of claim 4 wherein the wireless path is an IEEE standard 802.11(b) path.

8. The method of claim 4 wherein the wireless path is a Bluetooth standard path.

9. The method of claim 1 wherein the information is acquired via wired means.

10. The method of claim 9 wherein the wired means is a hardware interface.

11. The method of claim 9 wherein the wired means is a FireWire link.

12. The method of claim 1 further comprising verifying a specific user of the equipment based on which portable device was used to scan the code.

13. The method of claim 1 further comprising allowing the user to specify a time range for the use of the equipment.

14. The method of claim 1 wherein the code is scanned from printed material.

15. The method of claim 1 wherein the code is scanned from another portable scanning device.

16. A system for using a portable scanning device for allowing a user to acquire information associated with codes, the system configured to:
scan a code using a portable device wherein the portable device comprises code scanning equipment;
acquire information associated with the scanned code, wherein the acquired information comprises an upcoming schedule of use of equipment associated with the code; and
schedule the use of the equipment.

17. The system of claim 16 further configured to present the acquired information to the user at a docking station via an output device at the docking station.

18. The system of claim 16 further configured to present the acquired information to the user at the portable device via an output device at the portable device.

19. The system of claim 16 wherein the information is communicated via a wireless path.

20. The system of claim 19 wherein the wireless path is an infrared path.

21. The system of claim 19 wherein the wireless path is a radio frequency path.

22. The system of claim 19 wherein the wireless path is an IEEE standard 802.11(b) path.

23. The system of claim 19 wherein the wireless path is a Bluetooth standard path.

24. The system of claim 16 wherein the information is communicated via wired means.

25. The system of claim 24 wherein the wired means is a hardware interface.

26. The system of claim 24 wherein the wired means is a FireWire link.

27. The system of claim 16 further configured to verify a specific user of the equipment based on which portable device was used to scan the code.

28. The system of claim 16 further configured to allow the user to specify a time range for the use of the equipment.

29. The system of claim 16 wherein the code is scanned from printed material.

30. The system of claim 16 wherein the code is scanned from another portable scanning device.

31. A method for using a portable scanning device for acquiring information associated with codes comprising:
scanning a code using a portable device wherein the portable device comprises code scanning equipment;
acquiring information associated with the scanned code; and
scheduling the use of a facility associated with the code.

32. The method of claim 31 further comprising presenting the acquired information to a user at a docking station via an output device at the docking station.

33. The method of claim 31 further comprising presenting the acquired information to a user at the portable device via an output device at the portable device.

34. The method of claim 31 wherein the information is acquired via a wireless path.

35. The method of claim 34 wherein the wireless path is an infrared path.

36. The method of claim 34 wherein the wireless path is a radio frequency path.

37. The method of claim 34 wherein the wireless path is an IEEE standard 802.11(b) path.

38. The method of claim 34 wherein the wireless path is a Bluetooth standard path.

39. The method of claim 31 wherein the information is acquired via wired means.

40. The method of claim 39 wherein the wired means is a hardware interface.

41. The method of claim 39 wherein the wired means is a FireWire link.

42. The method of claim 31 further comprising verifying a specific user of the facility based on which portable device was used to scan the code.

43. The method of claim 31 further comprising allowing the user to specify a time range for the use of the facility.

44. The method of claim 31 wherein the code is scanned from printed material.

45. The method of claim 31 wherein the code is scanned from another portable scanning device.

46. A system for using a portable scanning device for allowing a user to acquire information associated with codes, the system configured to:
scan a code using a portable device wherein the portable device comprises code scanning equipment;
acquire information associated with the scanned code; and
schedule the use of a facility associated with the code.

47. The system of claim 46 further configured to present the acquired information to the user at the docking station via an output device at a docking station.

48. The system of claim 46 further configured to present the acquired information to the user at the portable device via an output device at the portable device.

49. The system of claim 46 wherein the information is communicated via a wireless path.

50. The system of claim 49 wherein the wireless path is an infrared path.

51. The system of claim 49 wherein the wireless path is a radio frequency path.

52. The system of claim 49 wherein the wireless path is an IEEE standard 802.11(b) path.

53. The system of claim 49 wherein the wireless path is a Bluetooth standard path.

54. The system of claim 46 wherein the information is communicated via wired means.

55. The system of claim 54 wherein the wired means is a hardware interface.

56. The system of claim 54 wherein the wired means is a FireWire link.

57. The system of claim 46 further configured to verify a specific user of the facility based on which portable device was used to scan the code.

58. The system of claim 46 further configured to allow the user to specify a time range for the use of the facility.

59. The system of claim 46 wherein the code is scanned from printed material.

60. The system of claim 46 wherein the code is scanned from another portable scanning device.

* * * * *

UNITED STATES PATENT AND TRADEMARK OFFICE
CERTIFICATE OF CORRECTION

PATENT NO. : 6,766,956 B1  
APPLICATION NO. : 09/878050  
DATED : July 27, 2004  
INVENTOR(S) : Peter C. Boylan, III et al.

Page 1 of 1

It is certified that error appears in the above-identified patent and that said Letters Patent is hereby corrected as shown below:

Title page item 54, change "BAR-CODE" to --A CODE--.

Sheet 11, Figure 10, change "CATEGROY" to --CATEGORY--.

Sheet 13, Figure 12, change "CATEGROY" to --CATEGORY--.

Column 1, line 2, change "BAR-CODE" to --A CODE--.

Column 2, line 3, delete "," after the word "device".

Column 8, line 12, delete "," after the word "output".

Column 8, line 18, change "suitable a portable" to --suitable portable--.

Column 10, line 4, delete "." after second occurrence of "codes".

Column 10, line 19, delete "," after "If".

Column 11, line 4, delete "," after "If".

Column 13, line 43, delete "co".

Column 14, line 41, insert --.-- after "etc.)".

Signed and Sealed this

Tenth Day of March, 2009

JOHN DOLL  
*Acting Director of the United States Patent and Trademark Office*